(12) United States Patent
Kim et al.

(10) Patent No.: US 11,036,331 B2
(45) Date of Patent: Jun. 15, 2021

(54) TOUCH DISPLAY DEVICE

(71) Applicant: LG Display Co., Ltd., Seoul (KR)

(72) Inventors: HoonBae Kim, Seoul (KR); SunYeop Kim, Seoul (KR); SungHoon Lee, Gyeongsangbuk-do (KR); SeungMok Shin, Daegu (KR); SungChul Kim, Gyeonggi-do (KR); Youngwoo Jo, Gyeonggi-do (KR); Seongkyu Kang, Gyeonggi-do (KR); HongJu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/460,697

(22) Filed: Jul. 2, 2019

(65) Prior Publication Data
US 2020/0073530 A1   Mar. 5, 2020

(30) Foreign Application Priority Data

Aug. 29, 2018  (KR) .......................... 10-2018-0102128

(51) Int. Cl.
| | |
|---|---|
| *G06F 3/041* | (2006.01) |
| *G06F 3/044* | (2006.01) |
| *G06F 3/0354* | (2013.01) |
| *G06F 3/038* | (2013.01) |

(52) U.S. Cl.
CPC .......... *G06F 3/04162* (2019.05); *G06F 3/038* (2013.01); *G06F 3/03545* (2013.01); *G06F 3/0441* (2019.05); *G06F 3/04166* (2019.05); *G06F 2203/04104* (2013.01)

(58) Field of Classification Search
None
See application file for complete search history.

(56) References Cited

U.S. PATENT DOCUMENTS

| | | | | |
|---|---|---|---|---|
| 2015/0242043 | A1* | 8/2015 | Oda | .................... G06F 3/04162 345/174 |
| 2016/0252981 | A1 | 9/2016 | Chang et al. | |
| 2017/0038866 | A1* | 2/2017 | Akhavan Fomani | ....................... G06F 3/0443 |
| 2018/0150178 | A1 | 5/2018 | Kim et al. | |
| 2018/0181241 | A1* | 6/2018 | Jung | .................... G06F 3/0412 |

FOREIGN PATENT DOCUMENTS

WO   WO 2017/023443 A1   2/2017

\* cited by examiner

*Primary Examiner* — Parul H Gupta
(74) *Attorney, Agent, or Firm* — Fenwick & West LLP

(57) ABSTRACT

A touch display device accurately distinguishes a touch input performed using a finger and a touch input performed using a pen, such as a stylus, significantly reduce a touch sensing time, simultaneously perform a display operation and a touch sensing operation, and operate in a power saving manner. Touch sensing does not restrict an image display time of a display panel. Touch inputs are sensed without degradation in touch performance, which would otherwise be caused by parasitic capacitance occurring in electrodes within the display panel, such as data lines or gate lines.

27 Claims, 24 Drawing Sheets

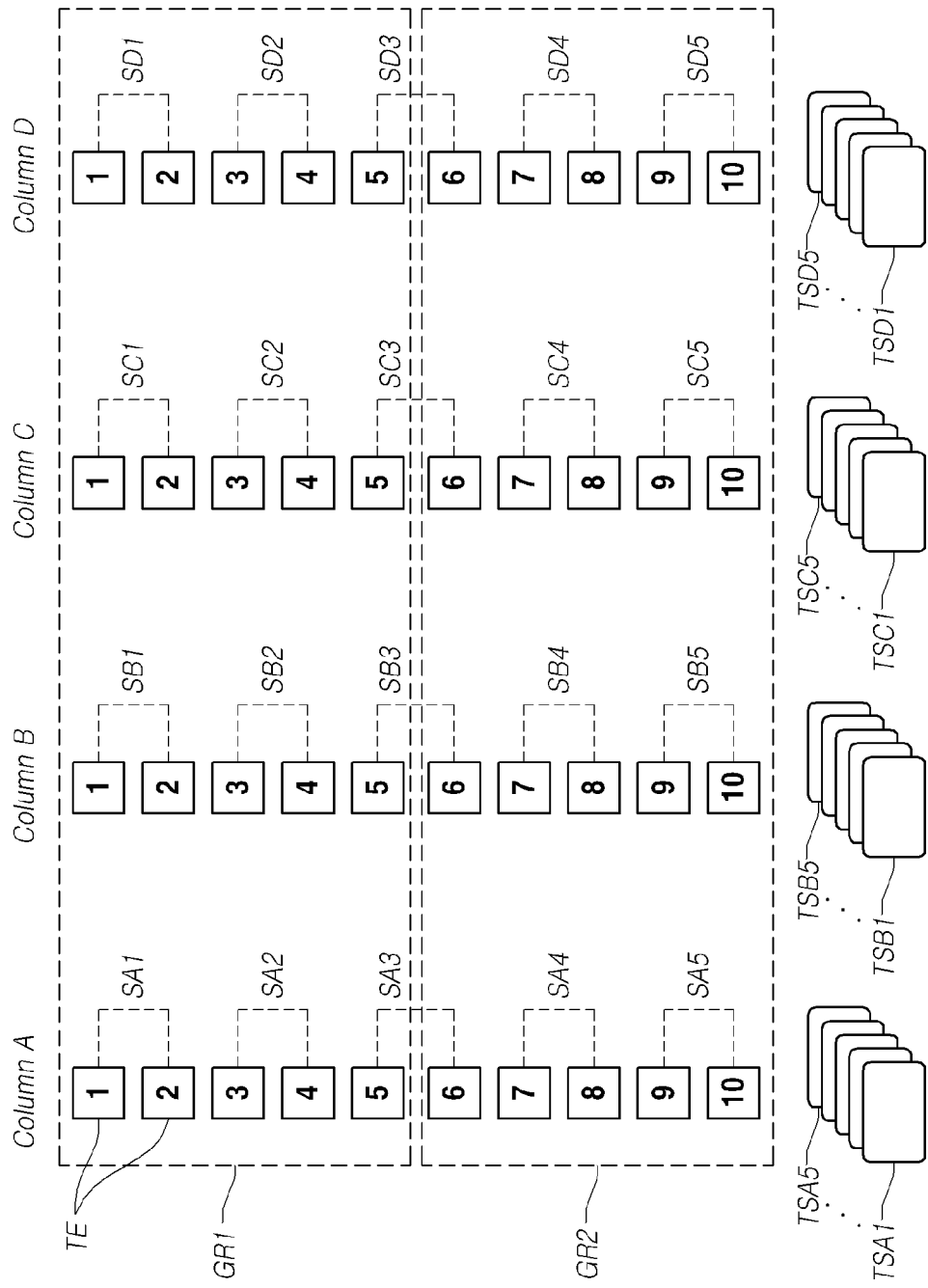

| Time | 1SP | |
|---|---|---|
| Sensor | Sensing | Reference |
| TSA1 | A1 | A2 |
| TSA2 | A3 | A4 |
| TSA3 | A5 | A6 |
| TSA4 | A7 | A8 |
| TSA5 | A9 | A10 |

B

| Time | 1SP | |
|---|---|---|
| Sensor | Sensing | Reference |
| TSB1 | B1 | B2 |
| TSB2 | B3 | B4 |
| TSB3 | B5 | B6 |
| TSB4 | B7 | B8 |
| TSB5 | B9 | B10 |

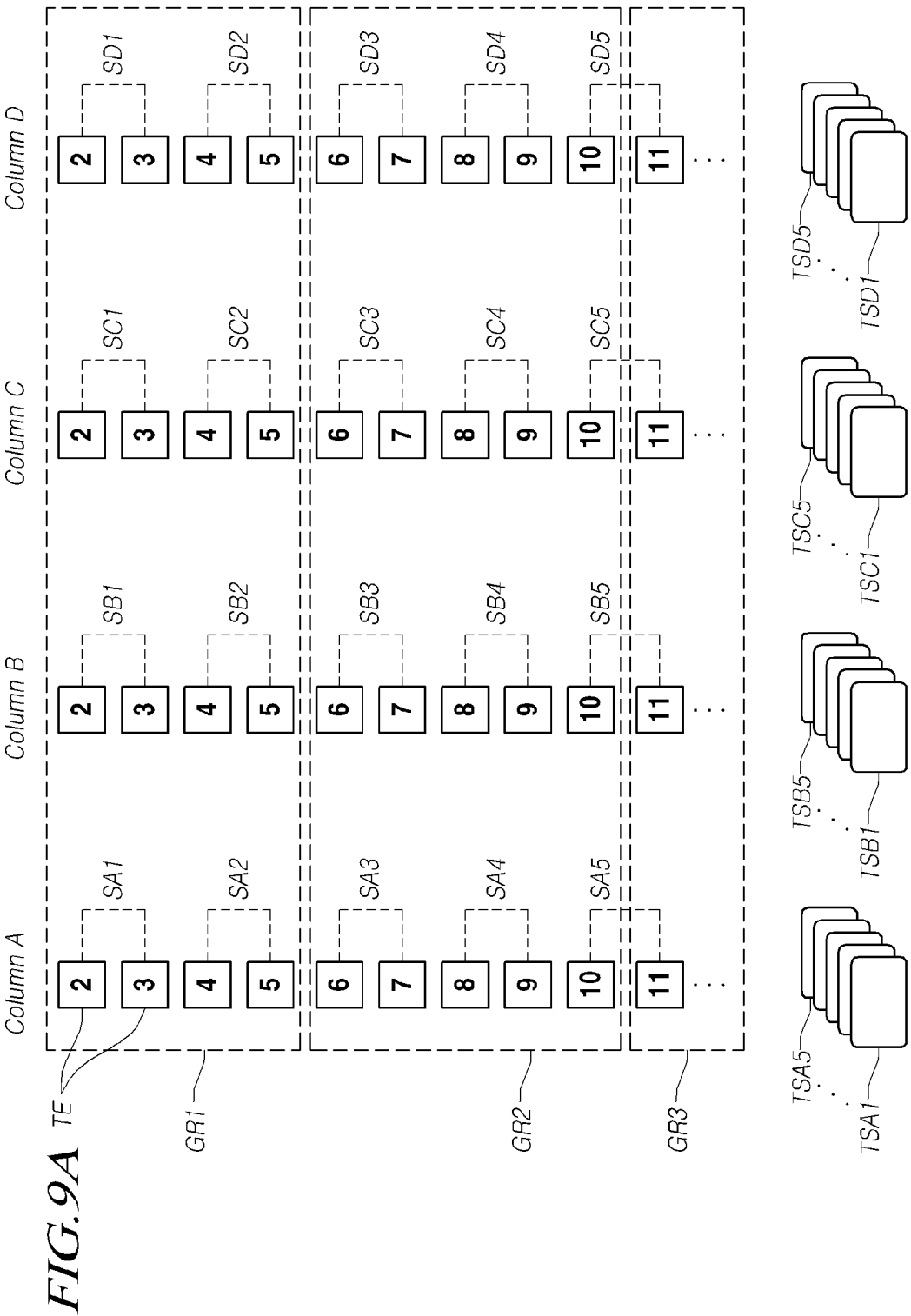

| Time | 2SP | |
|---|---|---|
| Sensor | Sensing | Reference |
| TSA1 | A2 | A3 |
| TSA2 | A4 | A5 |
| TSA3 | A6 | A7 |
| TSA4 | A8 | A9 |
| TSA5 | A10 | A11 |

B

| Time | 2SP | |
|---|---|---|
| Sensor | Sensing | Reference |
| TSB1 | B2 | B3 |
| TSB2 | B4 | B5 |
| TSB3 | B6 | B7 |
| TSB4 | B8 | B9 |
| TSB5 | B10 | B11 |

| Time | 1SP | |
|---|---|---|
| Sensor | Sensing | Reference |
| TSA1 | A1 | A6 |
| TSA2 | A2 | A7 |
| TSA3 | A3 | A8 |
| TSA4 | A4 | A9 |
| TSA5 | A5 | A10 |

B

| Time | 1SP | |
|---|---|---|
| Sensor | Sensing | Reference |
| TSB1 | B1 | B6 |
| TSB2 | B2 | B7 |
| TSB3 | B3 | B8 |
| TSB4 | B4 | B9 |
| TSB5 | B5 | B10 |

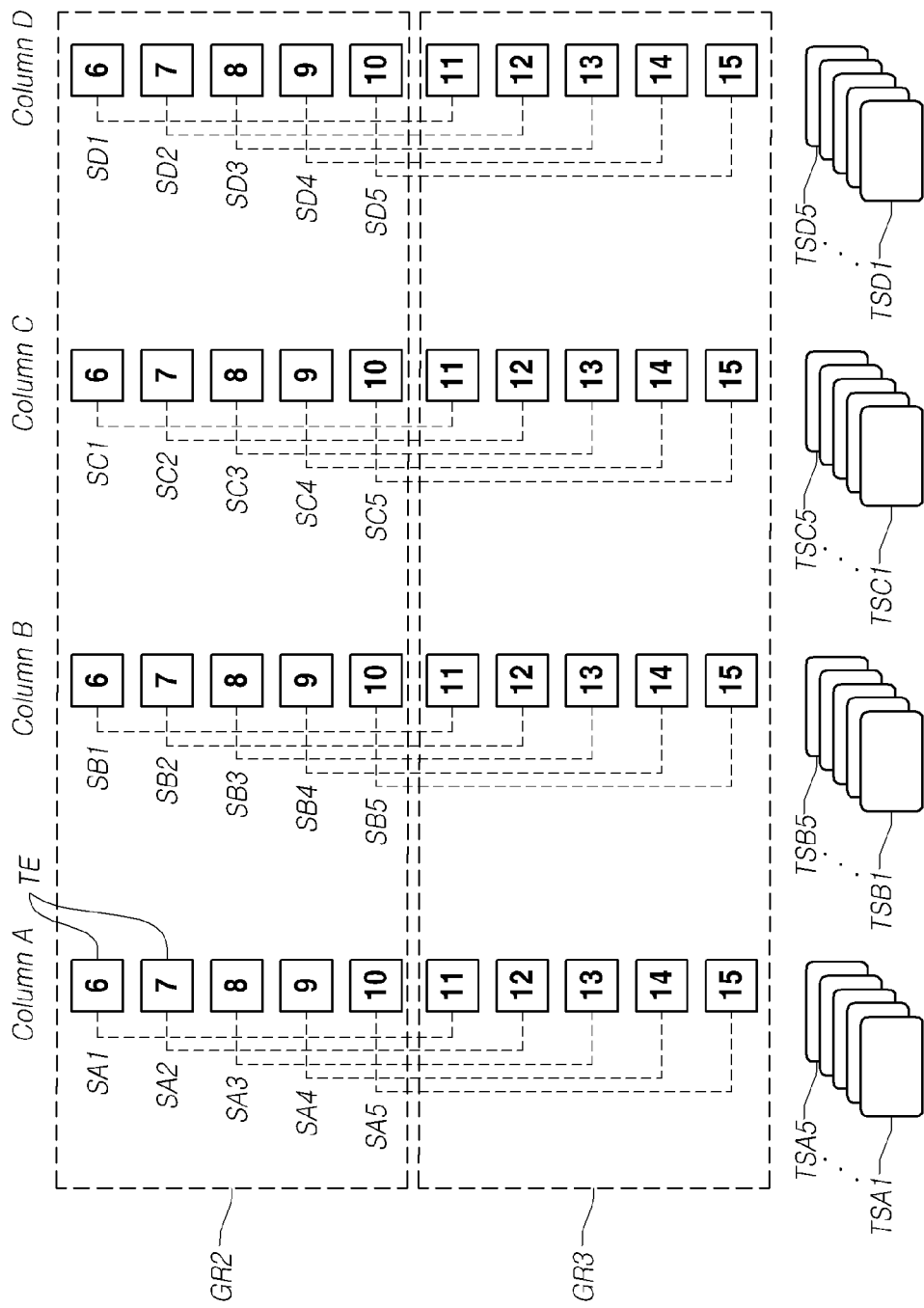

| Time | 2SP | |
|---|---|---|
| Sensor | Sensing | Reference |
| TSA1 | A6 | A11 |
| TSA2 | A7 | A12 |
| TSA3 | A8 | A13 |
| TSA4 | A9 | A14 |
| TSA5 | A10 | A15 |

B

| Time | 2SP | |
|---|---|---|
| Sensor | Sensing | Reference |
| TSB1 | B6 | B11 |
| TSB2 | B7 | B12 |
| TSB3 | B8 | B13 |
| TSB4 | B9 | B14 |
| TSB5 | B10 | B15 |

TOUCH DISPLAY DEVICE

CROSS REFERENCE TO RELATED APPLICATION

This application claims priority to Republic of Korea Patent Application No. 10-2018-0102128, filed on Aug. 29, 2018, which is hereby incorporated by reference in its entirety.

BACKGROUND

Field

The present disclosure relates to a touch display device.

Description of Related Art

In response to the development of the information society, demand for a variety of types of display devices for displaying images is increasing. In this regard, a range of display devices, such as liquid crystal display (LCD) devices, plasma display devices, organic light-emitting diode (OLED) display devices, quantum dot display devices, and micro LED devices, have recently come into widespread use.

Among such display devices, touch display devices provide touch-based user interfaces enabling users to intuitively and conveniently input data or instructions directly to devices, rather than using conventional data input systems, such as buttons, a keyboard, or a mouse.

To provide such touch-based user interfaces, touch display devices must be able to sense a touch performed by a user and accurately determine touch coordinates (or a touched point).

In this regard, capacitance-based touch sensing is commonly used to sense a touch and to determine touch coordinates based on a change in capacitance occurring in a plurality of touch electrodes disposed on a touch panel (or a touchscreen panel) as touch sensors or between the touch electrodes and a pointer, such as a finger.

A touch display device based on such capacitance-based touch sensing must sense a plurality of touch electrodes to sense a touch, and in this regard, apply a touch driving signal to the plurality of touch electrodes.

In addition, a variety of attempts to dispose touch electrodes within a display device have been undertaken for the purpose of fabrication facilitation, miniaturization, and the like, of touch display devices.

In addition, in devices requiring an elaborate touch input operation, a tool, such as a pen, may be used for a touch input operation. However, it may be a significantly difficult technical challenge to simultaneously sense a touch input performed using a finger and a touch input performed using a tool, such as a pen, due to different structural and physical characteristics between the finger and the tool.

SUMMARY

Various aspects of the present disclosure provide a touch display device able to accurately distinguish a touch input performed using a finger and a touch input performed using a pen, such as a stylus, significantly reduce a touch sensing time, simultaneously perform a display operation and a touch sensing operation, and operate in a power saving manner.

In one embodiment, a touch display device comprises: a display panel including a plurality of data lines, a plurality of gate lines, a plurality of touch electrodes, and a plurality of touch lines connected to the plurality of touch electrodes, wherein the display panel alternately operates in a pen search mode during which a pen is detected or a local scan mode during which a position of the detected pen on the display panel is sensed, and wherein each of the pen search mode and the local scan mode of the display panel comprises a plurality of display sections during which an image is updated and displayed on the display panel and a plurality of blank sections during which the image is not updated on the display panel; and a touch driver circuit detecting a touch of the touch display device by a finger or the pen based on a change in capacitance between the plurality of touch electrodes and the finger or the pen, wherein the touch driver circuit outputs a pen communications information signal to one or more of the plurality of touch electrodes during one or more of the plurality of blank sections of the pen search mode to transmit the pen communications information signal to the pen, and the touch driver circuit senses a position of the pen during one or more of the plurality of display sections of the local scan mode based on a pen output signal output by the pen responsive the pen communications information signal.

In one embodiment, a touch display device comprises: a display panel including a plurality of data lines, a plurality of gate lines, a plurality of touch electrodes, and a plurality of touch lines connected to the plurality of touch electrodes, wherein the display panel alternately operates in a pen search mode during which a pen is detected or a local scan mode during which a position of the detected pen on the display panel is sensed; and a touch driver circuit detecting a touch of the touch display device by a finger or the pen based on a change in capacitance between the plurality of touch electrodes and the finger or the pen, and wherein responsive to detecting the pen during the pen search mode, the display panel switches to the local scan mode during which the touch driver circuit detects at least one of a position of the pen on the display panel during a plurality of pen sensing sections or touch of the display panel by the finger during a plurality of finger sensing sections that are non-overlapping with the plurality of pen sensing sections, the plurality of pen sensing sections and the plurality of finger sensing sections included in a display section of the display panel during which an image is updated and displayed on the display panel.

According to exemplary embodiments, it is possible to provide a display device able to reduce a time for determining a touch input after sensing a touch input performed using a finger and a touch input performed using a pen and previously sense a touch area depending on circumstances.

According to exemplary embodiments, it is possible to provide a touch display device able to reduce consumption of driving power.

According to exemplary embodiments, it is possible to provide a touch display device having improved pen sensitivity.

According to exemplary embodiments, it is possible to provide a touch display device able to clearly distinguish a touch input performed using a finger and a touch input performed using a pen.

According to exemplary embodiments, it is possible to provide a touch display device able to reduce the effect of parasitic capacitance caused by surrounding electrodes or lines when sensing a touch input performed using a finger and a touch input performed using a pen.

According to exemplary embodiments, it is possible to provide a touch display device able to increase an image display time by simultaneously performing an image display operation and an operation of sensing a touch input performed using a finger or a touch input performed using a pen.

BRIEF DESCRIPTION OF THE DRAWINGS

The above and other objects, features, and advantages of the present disclosure will be more clearly understood from the following detailed description when taken in conjunction with the accompanying drawings, in which:

FIG. 8A schematically illustrates a differential sensing method for adjacently-located touch electrodes during a first sensing period of the touch display device according to embodiments of the present disclosure;

FIG. 8B schematically illustrates differential sensing tables for adjacently-located touch electrodes during a first sensing period of the touch display device according to embodiments of the present disclosure;

FIG. 9A schematically illustrates a differential sensing method for adjacently-located touch electrodes during a second sensing period of the touch display device according to embodiments of the present disclosure;

FIG. 9B schematically illustrates differential sensing tables for adjacently-located touch electrodes during a second sensing period of the touch display device according to embodiments of the present disclosure;

FIG. 10B schematically illustrates differential sensing tables for remotely-located touch electrodes during a first sensing period of the touch display device according to embodiments of the present disclosure;

FIG. 11A schematically illustrates a differential sensing method for remotely-located touch electrodes during a second sensing period of the touch display device according to embodiments of the present disclosure;

FIG. 11B schematically illustrates differential sensing tables for remotely-located touch electrodes during a second sensing period of the touch display device according to embodiments of the present disclosure;

DETAILED DESCRIPTION

Figure 1:
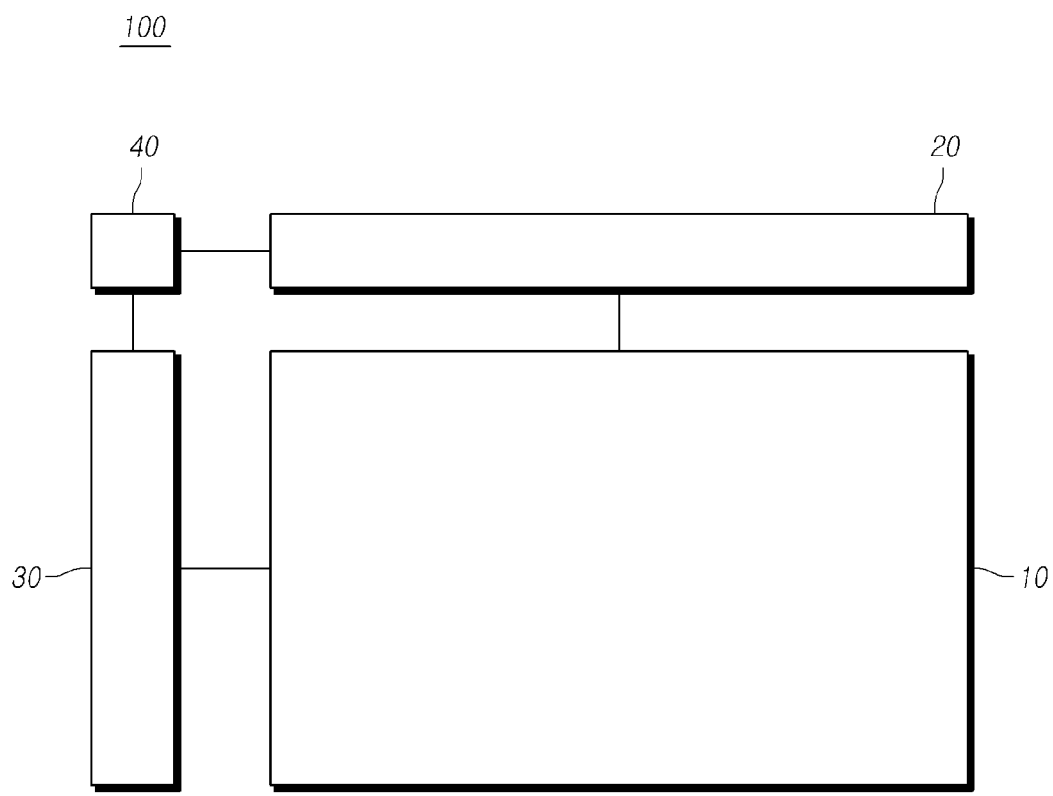
FIG. 1 is a schematic diagram illustrating a typical display device.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly located on or under another element, but it can also be indirectly located on or under another element via an intervening element.

The shapes, sizes, ratios, angles, numbers, and the like of the components illustrated in the drawings to describe embodiments of the present disclosure are for illustrative purposes, and the present disclosure is not limited thereto. Throughout this document, the same reference numerals and symbols will be used to designate the same or like components. In the following description of the present disclosure, detailed descriptions of well-known technologies of the art will be omitted in the case that the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary. In the analysis of a component, it shall be understood that an error range is included therein, even in the case in which there is no explicit description thereof.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in many different forms. Rather, these embodiments are provided so that the present disclosure will be thorough and complete, and will fully convey the scope of the present disclosure to a person having ordinary skill in the art. The scope of the present disclosure shall be defined by the appended Claims.

The touch display device according to embodiments of the present disclosure may be provided in various types of display devices. For example, a touch controller circuit and touch sensors within the scope of embodiments of the present disclosure may be provided in various types of display devices, such as "liquid crystal display (LCD) devices," "organic light-emitting diode (OLED) display devices," "electroluminescent display devices," "plasma display devices," "quantum dot display devices," or "micro LED devices." The following description will mainly be focused on specific examples applied to "LCD devices."

In addition, embodiments of the present disclosure may be realized in various types of touch display devices. For example, capacitance-based touch sensing or resistive membrane-based ouch sensing, designed to sense changes in capacitance, may be used in the touch display device. That is, any type of touch display device may be applicable as long as the touch display device determines a touch and a touched position using a touch driving signal. The following description will mainly be focused on specific examples used in a capacitance-based touch display device.

FIG. 1 is a schematic diagram illustrating a typical display device 100. The display device 100 may include a display panel 10, a data driver circuit 20, a gate driver circuit 30, and a timing control circuit 40.

Although not shown in FIG. 1, the display device 100 may include a plurality of data lines, a plurality of gate lines, a plurality of subpixels, and the like.

In addition, the plurality of data lines and the plurality of gate lines may be disposed on the display panel 10 and the plurality of subpixels defined by the plurality of data lines and the plurality of gate lines may be disposed in the display panel 10, so that the display device 100 can be provided with an image display function.

The plurality of data lines are controlled by the data driver circuit 20, the plurality of gate lines are controlled by the gate driver circuit 30, and the data driver circuit 20 and the gate driver circuit 30 are controlled by the timing control circuit 40.

In addition, the plurality of subpixels may be disposed within the display panel 10. The plurality of subpixels may receive pixel voltages applied from the plurality of data lines to form electric fields in concert with a common electrode acting as a counterpart electrode, thereby displaying images.

Figure 2:
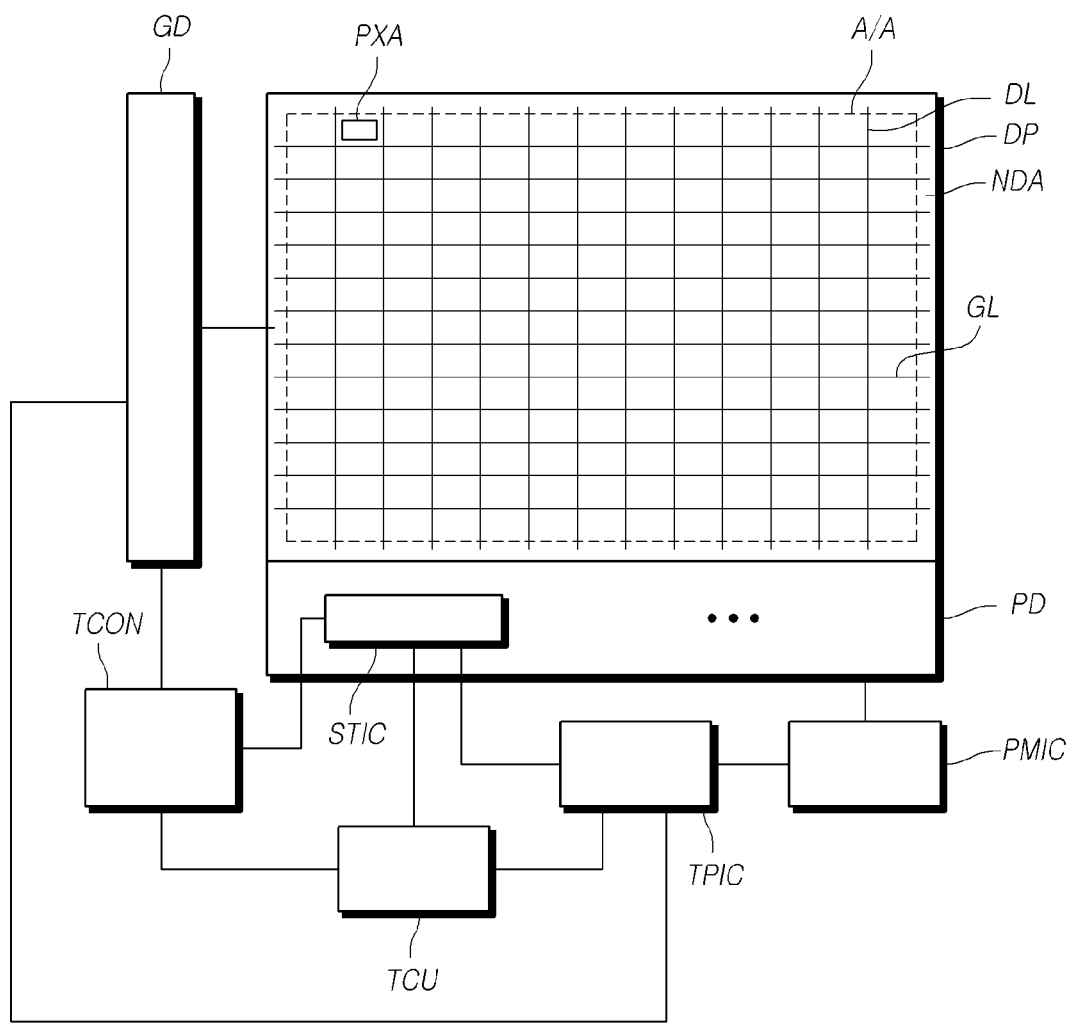
FIG. 2 is a schematic diagram illustrating a touch display device according to embodiments of the present disclosure.

Referring to FIG. 2, a touch display device 200 according to embodiments of the present disclosure includes a display panel DP, a gate driver GD, a touch driver STIC, a timing controller TCON, a touch controller TCU, a touch power supply TPIC, a panel power supply PMIC, and the like.

The display panel DP of the touch display device 200 according to embodiments of the present disclosure includes an active area A/A on which images are displayed and a non-active area NDA on which images are not displayed. In addition, the display panel DP includes a plurality of data lines DL and a plurality of gate lines GL, as well as a plurality of pixel areas PXA defined by the data lines DL and the gate lines GL or disposed between the data lines DL and the gate lines GL.

The touch driver STIC has a circuit embedded therein to enable touch driving and touch sensing. In addition, the touch driver STIC may further have a data driver circuit embedded therein to control the data lines DL in order to display images on the display panel DP. Here, as illustrated in FIG. 2, the touch driver STIC may be disposed in a driving area PD of the display panel DP. Due to these arrangements, the touch driver STIC has as a chip-on-glass (COG) structure.

The gate driver GD is connected to the gate lines GL disposed on the display panel DP. In addition, the gate driver GD controls turn-on and turn-off of driving transistors, such as thin-film transistors (TFTs), by which the data lines DL are caused to apply data voltages to the pixel areas PXA to display images on the display panel DP. The gate driver GD may have a gate-in-panel (GIP) structure disposed within the display panel DP or may be implemented as a separate film-type circuit (e.g. a chip-on-film (COF)) connected to the display panel DP.

The panel power supply PMIC may generate electric power or voltages for driving the display panel DP and apply the electric power or voltages to the display panel DP. In addition, the panel power supply PMIC may generate electric power for the touch power supply TPIC and supply the electric power to the touch power supply TPIC.

The touch power supply TPIC may generate electric power or voltages for the touch driver STIC and transfer the electric power or voltages to the touch driver STIC. In addition, the touch power supply TPIC may generate electric power or voltages for touch driving and touch sensing and transfer the electric power or voltages to the touch driver STIC, the gate driver GD, or the display panel DP.

The touch controller TCU controls the touch power supply TPIC so that electric power or voltages for the touch driver STIC are input to the touch driver STIC. In addition, the touch controller TCU controls the touch driver STIC to sense a touch input to the display panel DP. In addition, the touch controller TCU obtains touch coordinates by calculating raw touch data sensed by the touch driver STIC.

The touch controller TCU controls the touch power supply TPIC so that electric power or voltages for the touch driver STIC are input to the touch driver STIC. In addition, the touch controller TCU controls the touch driver STIC to sense a touch input to the display panel DP.

Here, the touch controller TCU may generate a touch source signal for touch driving and output the touch source signal to the touch power supply TPIC. The touch source signal may be, for example, a touch driving signal for sensing a touch input performed using a finger or a source signal for generating a touch sensing signal. In addition, the touch source signal may be a source signal for generating a load reducing signal to reduce parasitic capacitance between touch electrodes and other electrodes within the display panel DP. In addition, the touch source signal may be a source signal for generating a pen communications information signal used for communication between a pen and the display panel DP. In addition, the touch source signal may be a source signal for generating a pen synchronization signal for communication between the pen and the display panel DP.

The touch power supply TPIC according to embodiments of the present disclosure may receive a touch source signal from the touch controller TCU and generate and output a variety of signals or voltages. The touch power supply TPIC may generate a touch driving signal or a touch sensing signal to sense a touch input performed using a finger and output the touch driving signal or the touch sensing signal to the touch driver STIC. In addition, the touch power supply TPIC may output the load reducing signal for reducing parasitic capacitance between the touch electrodes and other electrodes within the display panel DP to the touch driver STIC. Here, the load reducing signal may be the same signal as the touch driving signal or the touch sensing signal. In addition, the pen communications information signal for communications between the pen and the display panel DP may be output to the touch driver STIC, or the pen synchronization signal for communication between the pen and the display panel DP may be output to the touch driver STIC. In addition, the load reducing signal to be applied to the gate lines GL may be output to the gate driver GD. The load reducing signal to be applied to the gate lines GL may be a signal having the same voltage variation and the same phase as, but a different voltage level from, the touch driving signal or the touch sensing signal. That is, if the touch driving signal or the touch sensing signal is a signal repeatedly swinging and changing from 2V to 8V, the load reducing signal to be applied to the gate lines GL may be a signal repeatedly swinging and changing from −2V to −8V. This is because the driving transistors, such as TFTs, in the pixel areas PXA of the display panel DP must remain in a turn-off state while the load reducing signal is being applied to the gate lines GL, so that no effect is applied to an image displayed on the display panel DP.

The timing controller TCON may control a data driver in either the gate driver GD or the touch driver STIC, and transfer image information applied from an external source to the data driver. In addition, the timing controller TCON controls the gate driver GD at a suitable point in time to display an image on the display panel DP. In addition, the timing controller TCON may control touch driving by communicating with the touch controller TCU.

Figure 3:
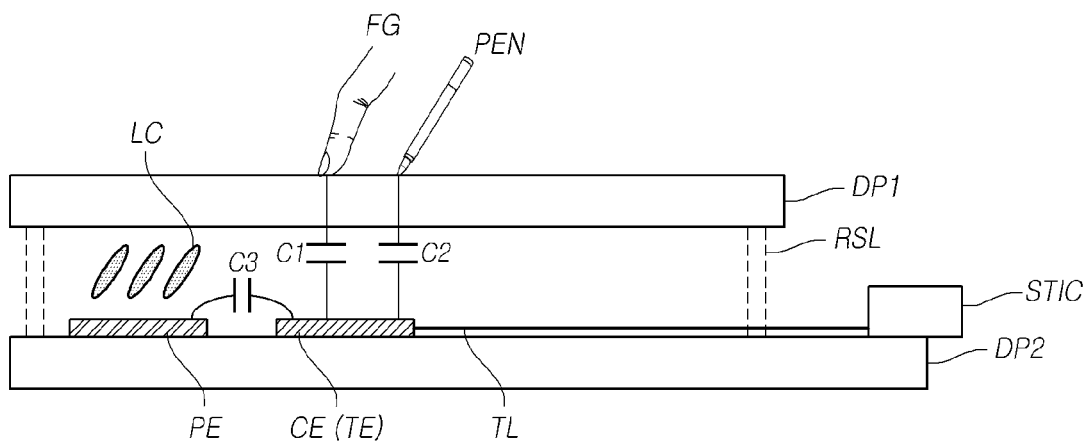
FIG. 3 schematically illustrates a cross-sectional of the touch display device according to embodiments of the present disclosure.

Referring to FIG. 3, a cross-section of the touch display device 200 according to embodiments of the present disclosure is illustrated. In FIG. 3, the display panel DP may include a first substrate DP1 and a second substrate DP2. Liquid crystal LC is disposed in the pixel areas between the first substrate DP1 and the second substrate DP2. When a suitable voltage is applied to a pixel electrode PE and a common electrode CE at a suitable point in time, an electric field is generated between the pixel electrode PE and the common electrode CE, and the liquid crystal LC is controlled by the electric field C3. The liquid crystal LC controlled as above controls transmissions of light according to the pixel areas. Consequently, a suitable image may be displayed. Here, the common electrode CE may be used as electrodes to display an image, and may be used as the touch electrodes to sense a touch input performed using a finger FG or a pen PEN. That is, the common electrode CE disposed within the display panel DP may be connected to touch lines TL, which are connected to the touch driver STIC, so that capacitance C1 generated between the finger FG and the common electrode CE or capacitance C2 generated between the pen PEN and the common electrode CE may be sensed to determine whether or not a touch has been input. In addition, the display panel DP may further include a sealing layer RSL preventing the liquid crystal LC within the display panel DP from leaking.

Figure 4:
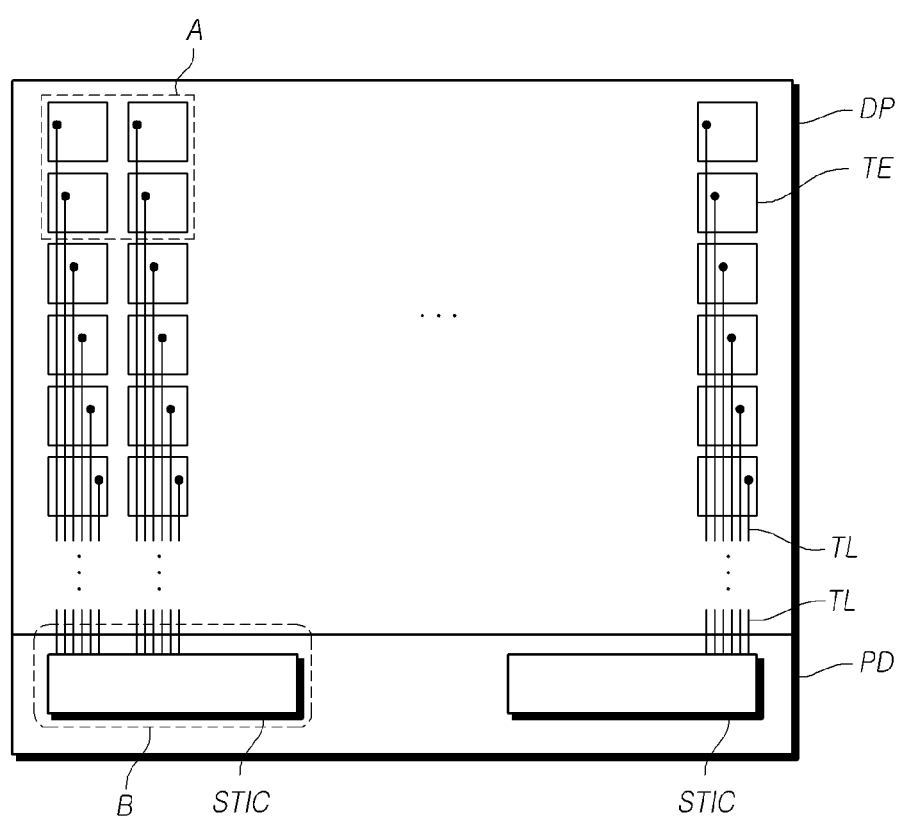
FIG. 4 schematically illustrates the touch display device according to embodiments of the present disclosure, including a plurality of touch electrodes.

Referring to FIG. 4, the touch display device 200 according to embodiments of the present disclosure includes a plurality of touch electrodes TE and a plurality of touch lines TL within the display panel DP. In addition, the touch display device 200 may further include one or more touch drivers STIC.

The touch electrodes TE of the touch display device 200 according to embodiments of the present disclosure may be one-to-one matched and connected to the plurality of touch lines TL. That is, a single touch electrode TE may be electrically connected to a single touch line TL, such that a touch input to an area in which the touch electrode TE is located may be sensed via the touch line TL. Here, the touch line TL may be disposed to overlap the touch electrode TE. That is, the touch line TL and the touch electrode TE may be disposed on different layers to overlap each other.

In addition, the touch electrodes TE of the touch display device 200 according to embodiments of the present disclosure may be disposed such that a single touch electrode TE is electrically connected to two or more touch lines TL. That is, a single touch electrode TE may be connected to two or more touch lines TL to reduce contact resistance between the touch electrodes TE and the touch lines TL or improve the transfer of the touch driving signal or the transfer of the touch sensing signal.

In addition, the touch lines TL of the touch display device 200 according to embodiments of the present disclosure are electrically connected to the touch driver STIC. The touch driver STIC may sense a touch input to each of the touch electrodes TE, disposed within the display panel DP, via the touch lines TL electrically connected thereto.

The touch display device 200 according to embodiments of the present disclosure includes the plurality of touch electrodes 1E embedded within the display panel DP. Here, a common electrode CE is provided within the display panel DP to display images. The common electrode CE may be used as the touch electrodes TE to sense a touch. In a case in which the common electrode CE is used as electrodes for display driving and electrodes for touch sensing, time division driving may be provided to divide a display driving time and a touch driving time in an alternating pattern. Alternatively, separate driving may be provided to separately control the display driving time and the touch driving time, instead of time division. Hereinafter, embodiments of the present disclosure will mainly be focused on separate driving. That is, a driving method of sensing a touch input performed using a finger or a touch input performed using the pen while displaying an image on the display panel DP will mainly be described.

Figure 5:
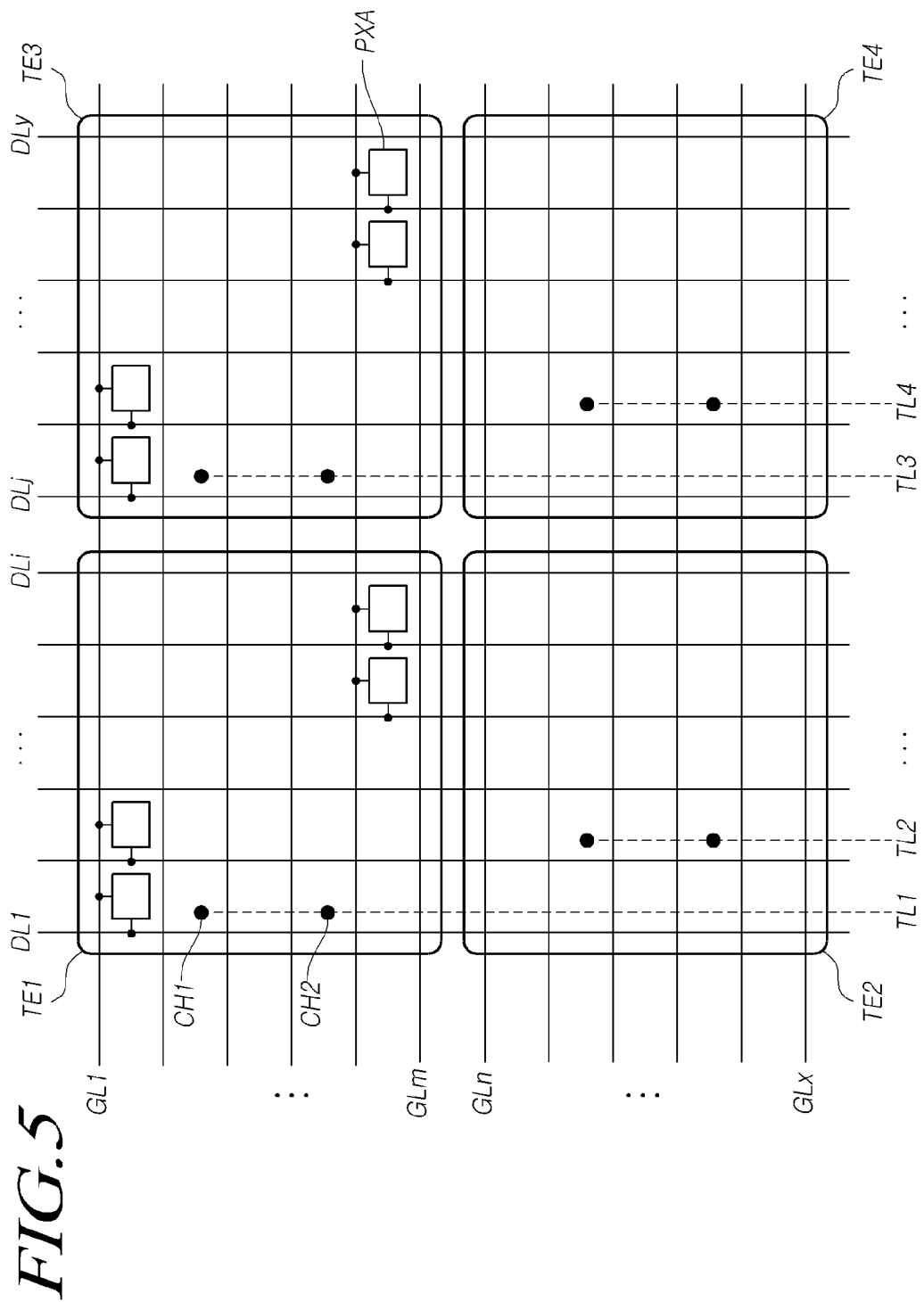
FIG. 5 is a schematic enlargement of area A in FIG. 4 according to one embodiment.

FIG. 5 is a schematic enlargement of area A in FIG. 4 according to one embodiment.

Referring to FIG. 5, the touch display device 200 according to embodiments of the present disclosure includes a first touch electrode TE1 and a second touch electrode TE2 arranged on the same column (e.g. the left column in FIG. 5). In addition, the touch display device 200 includes a third touch electrode TE3 and a fourth touch electrode TE4 arranged on the same column (e.g. the right column in FIG. 5).

In addition, the touch display device 200 includes a first touch line TL1 electrically connected to the first touch electrode TE1 via one or more contact holes CH1 and CH2. In addition, the touch display device 200 includes a second touch line TL2 electrically connected to the second touch electrode TE2 via one or more contact holes CH1 and CH2. In addition, the touch display device 200 includes a third touch line TL3 electrically connected to the third touch electrode 1E3 via one or more contact holes CH1 and CH2. In addition, the touch display device 200 includes a fourth touch line TL4 electrically connected to the fourth touch electrode TE4 via one or more contact holes CH1 and CH2. Here, the first touch line TL1 may be disposed to overlap the first touch electrode TE1 and the second touch electrode TE2. In addition, the second touch line TL2 may be disposed to overlap the second touch electrode TE2. In addition, the third touch line TL3 may be disposed to overlap the third touch electrode TE3 and the fourth touch electrode TE4. In addition, the fourth touch line TL3 may be disposed to overlap the fourth touch electrode TE4.

In addition, the first touch electrode TE1 of the touch display device 200 may be disposed to overlap a plurality of data lines DL1, . . . , and DLi and a plurality of gate lines GL1, . . . , and GLm. The second touch electrode TE2, arranged on the same column as the first touch electrode TE1, may be disposed to overlap the plurality of data lines DL1, . . . , and DLi and a plurality of gate lines GLn, . . . , and GLx.

In addition, the third touch electrode TE3 of the touch display device 200 may be disposed to overlap a plurality of data lines DLj, . . . , and DLy and the plurality of gate lines GL1, . . . , and GLm. The fourth touch electrode TE4, arranged on the same column as the third touch electrode TE3, may be disposed to overlap the plurality of data lines DLj, . . . , and DLy and the plurality of gate lines GLn, . . . , and GLx.

The size of the first touch electrode TE1 of the touch display device 200 according to embodiments of the present disclosure may be set to be several times greater than the size of each of the subpixel areas PXA. That is, the first touch electrode TE1 may be set to have a suitable size, allowing a plurality of subpixel areas PXA to be present within the first touch electrode TE1, so that the touch electrodes TE of this size can sense a touch input performed using a finger or the pen.

Figure 6:
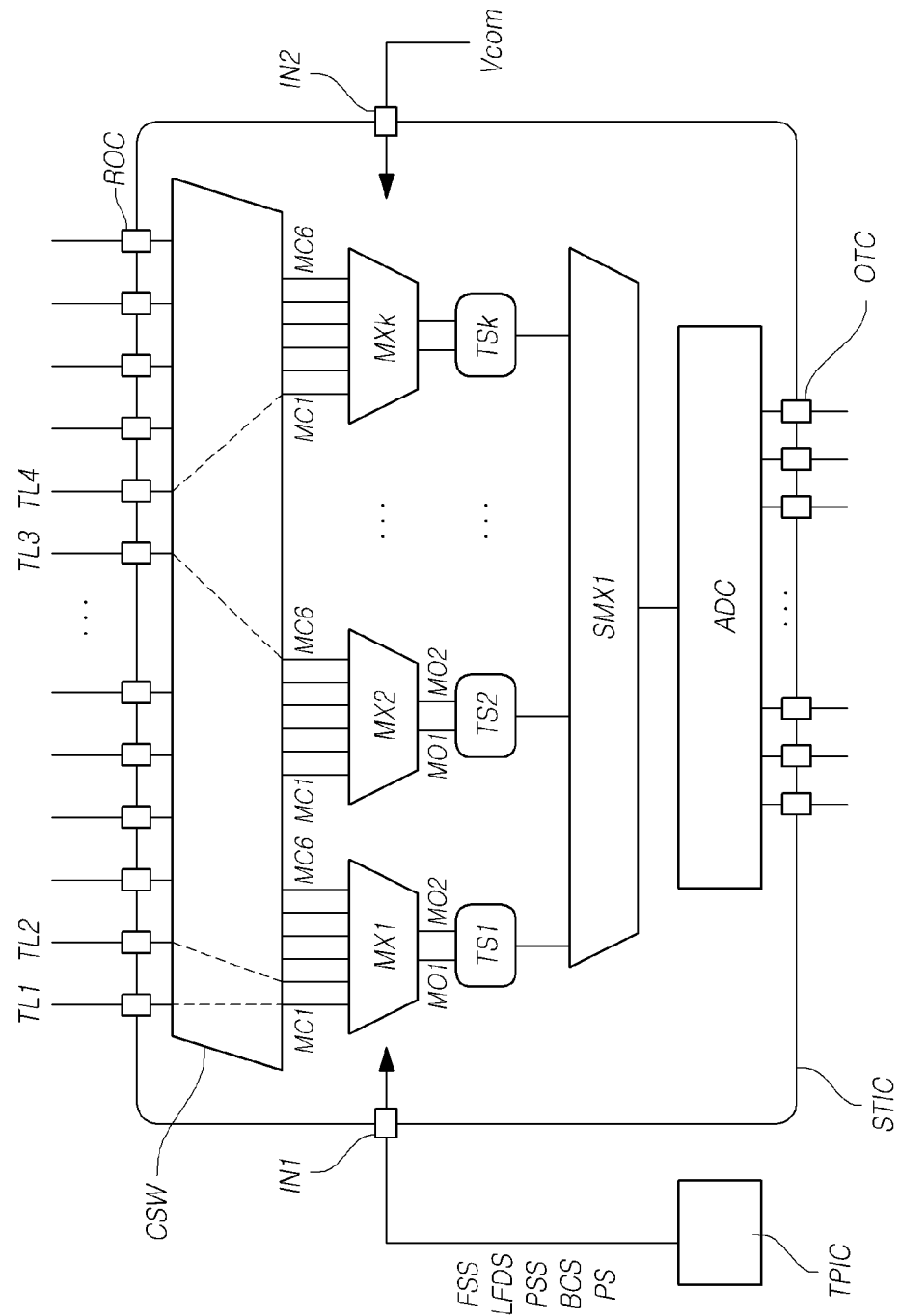
FIG. 6 is a schematic enlargement of area B in FIG. 4 according to one embodiment.

Referring to FIG. 6, the touch driver STIC of the touch display device 200 according to embodiments of the present disclosure includes at least one channel switch CSW, a plurality of touch multiplexers MX1, MX2, . . . , and MXk, a plurality of touch sensors TS1, TS2, . . . , and TSk, at least one selection multiplexer SMX1, and at least one analog-to-digital converter ADC.

In addition, the touch driver STIC of the touch display device 200 according to embodiments of the present disclosure includes a plurality of readout channels ROC, a plurality of output channels OTC, and one or more signal input ends IN1 and IN2.

The plurality of readout channels ROC of the touch driver STIC according to embodiments of the present disclosure are connected to the plurality of touch lines TL. Here, the plurality of readout channels ROC are electrically connected to the touch electrodes 1B, disposed within the display panel DP, via the touch lines. The plurality of touch sensors TS1, TS2, and TSk may be electrically connected to the touch electrodes TE via the readout channels ROC to sense a change in capacitance occurring in the touch electrodes TE.

In addition, the plurality of output channels OTC of the touch driver STIC are connected to the touch controller TCU. The touch driver STIC may receive a variety of signals from the touch power supply TPIC via the one or more input ends IN1 and IN2.

For example, the first input end IN1 may receive a finger sensing signal FSS, a load reducing signal LFDS, a pen sensing signal PSS, a pen communications information signal BCS, a pen synchronization signal PS, and the like, input thereto. In addition, the second input end IN2 may receive a common voltage Vcom input thereto. In addition, the touch driver STIC may receive the finger sensing signal FSS, the load reducing signal LFDS, the pen sensing signal PSS, the pen communications information signal BCS, the pen synchronization signal PS, and the common voltage Vcom from the touch power supply TPIC, transferred via the first input end IN1 and the second input end IN2.

Each of the touch multiplexers MX1, . . . , and MXk includes a plurality of multiplexer channels MC1, . . . , and MC6 connected to the touch lines via the channel switch CSW and a plurality of sensor channels MO1 and MO2 connected to a corresponding touch sensor among the touch sensors TS1, TS2, . . . , and TSk.

The channel switch CSW of the touch driver STIC electrically connects the channels of the touch multiplexer and the corresponding touch lines TL. For example, referring to FIG. 6, the first touch line TL1 is electrically connected to the first multiplexer channel MC1 of the first touch multiplexer MX1, the second touch line TL2 is electrically connected to the second multiplexer channel MC2 of the first touch multiplexer MX1, the third touch line TL3 is electrically connected to the sixth multiplexer channel MC6 of the second touch multiplexer MX2, and the fourth touch line TL4 is electrically connected to the first multiplexer channel MC1 of the $k^{th}$ touch multiplexer MXk. That is, the channel switch CSW may suitably electrically connect the touch lines TL and the channels of the plurality of touch multiplexers.

The characteristics of the channel switch CSW as described above are to perform functions required for differential sensing, and detailed descriptions thereof will be provided later.

The touch sensors TS according to embodiments of the present disclosure serve to sense touches input to the touch electrodes TE and the surroundings of the touch electrodes TE.

The touch sensors TS may perform differential sensing, and may sense touches by minimizing the interference of surrounding signals to the touch electrodes TE.

The selection multiplexer SMX1 selectively transfers raw touch data, sensed and output by the touch sensors TS, to the analog-to-digital converter ADC.

The analog-to-digital converter ADC converts the raw touch data, received from the selection multiplexer SMX1, from analog voltages to digital voltages, and outputs the digital voltages of the raw touch data.

Figure 7:
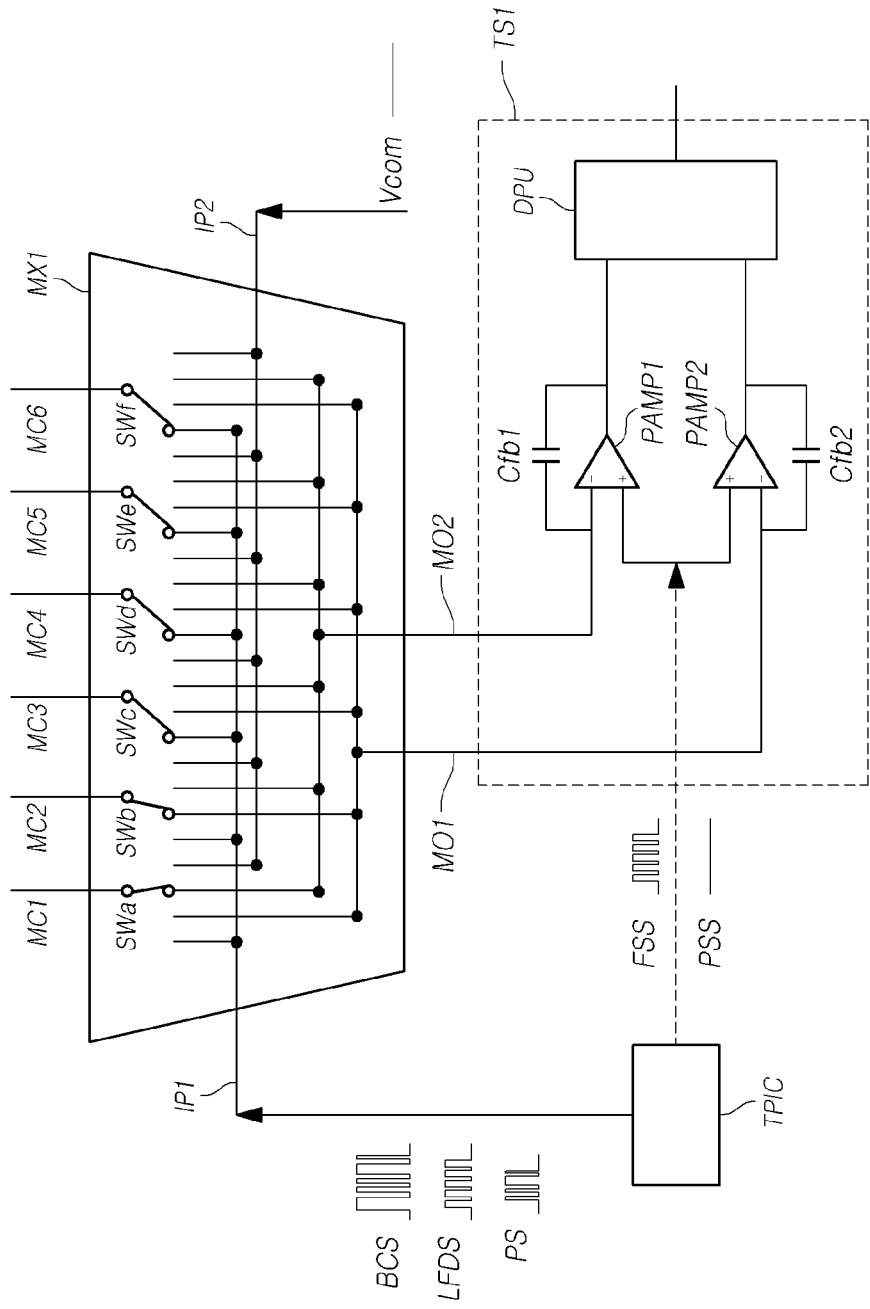
FIG. 7 schematically illustrates inner and outer configurations of the multiplexer and the touch sensors illustrated in FIG. 6 according to one embodiment.

Referring to FIG. 7, the first touch multiplexer MX1 of the touch display device 200 according to embodiments of the present disclosure includes a plurality of multiplexer switches SWa, SWb, Swc, SWd, SWe, and SWf and one or more input pins IP1 and IP2.

The first touch multiplexer MX1 may receive the pen communications information signal BCS, the load reducing signal LFDS, the pen synchronization signal PS, and the like output by the touch power supply TPIC, via the first signal input pin IP1. In addition, the first touch multiplexer MX1 may receive the common voltage Vcom or the like output by the touch power supply TPIC, via the second signal input pin IP2.

The touch display device 200 according to embodiments of the present disclosure connects the plurality of multiplexer channels MC1, MC2, MC3, MC4, MC5, and MC6 and the signal input pins IP1 and IP2 or the plurality of multiplexer channels MC1, MC2, MC3, MC4, MC5, and MC6 and the plurality of sensor channels MO1 and MO2 by controlling the plurality of multiplexer switches SWa, SWb, Swc, SWd, SWe, and SWf disposed within the first touch multiplexer MX1.

In addition, referring to FIG. 7, the first touch sensor TS1 of the touch display device 200 according to embodiments of the present disclosure is electrically connected to the plurality of sensor channels MO1 and MO2 of the first touch multiplexer MX1.

The first touch sensor TS1 of the touch display device according to embodiments of the present disclosure includes a first amplifier PAMP1, a second amplifier PAMP2, and a differential amplification processor DPU. In addition, the first amplifier PAMP1 is connected to a first feedback capacitor Cfb1, and the second amplifier PAMP2 is connected to a second feedback capacitor Cfb2. The differential amplification processor DPU conducts integration to differential-sensed raw touch data or the like by receiving signals output by the first amplifier PAMP1 and the second amplifier PAMP2.

In addition, the first touch sensor TS1 of the touch display device 200 according to embodiments of the present disclosure may sense a finger touch input or a pen touch input to the touch electrodes TE by receiving the finger sensing signal FSS or the pen sensing signal PSS output by the touch power supply TPIC. Here, the finger sensing signal FSS or the pen sensing signal PSS may be input to a non-inverting terminal (+) of the first amplifier PAMP1 and a non-inverting terminal (+) of the second amplifier PAMP2.

Referring to FIGS. 8A and 8B, a differential sensing method for adjacently-located touch electrodes during a first sensing period of the touch display device 200 according to embodiments of the present disclosure is illustrated.

Referring to FIG. 8A, the touch display device 200 according to embodiments of the present disclosure includes a first touch group GR1 comprised of first to fifth touch electrodes in column A, first to fifth touch electrodes in column B, first to fifth touch electrodes in column C, and first to fifth touch electrodes in column D. In addition, the touch display device 200 includes a second touch group GR2 comprised of sixth to tenth touch electrodes in column A, sixth to tenth touch electrodes in column B, sixth to tenth touch electrodes in column C, and sixth to tenth touch electrodes in column D.

Referring to Table A in FIG. 8B, a first touch sensor TSA1 of column A of the touch display device 200 according to embodiments of the present disclosure differentially senses the first touch electrode and the second touch electrode in column A during a first sensing period 1SP. Here, the first touch electrode in column A may be sensed as a sensing electrode "Sensing," while the second touch electrode in column A may be sensed as a reference electrode "Reference."

In addition, during the first sensing period, a second touch sensor TSA2 of column A differentially senses the third touch electrode and the fourth touch electrode in column A. Here, the third touch electrode in column A may be sensed as a sensing electrode, while the fourth touch electrode in column A may be sensed as a reference electrode.

In addition, during the first sensing period, a third touch sensor TSA3 in column A differentially senses the fifth touch electrode and the sixth touch electrode in column A Here, the fifth touch electrode in column A may be sensed as a sensing electrode, while the sixth touch electrode in column A may be sensed as a reference electrode.

In addition, during the first sensing period, a fourth touch sensor TSA4 in column A differentially senses the seventh touch electrode and the eighth touch electrode in column A. Here, the seventh touch electrode in column A may be sensed as a sensing electrode, while the eighth touch electrode in column A may be sensed as a reference electrode.

In addition, during the first sensing period, a fifth touch sensor TSA5 in column A differentially senses the ninth touch electrode and the tenth touch electrode in column A. Here, the ninth touch electrode in column A may be sensed as a sensing electrode, while the tenth touch electrode in column A may be sensed as a reference electrode.

As described above, the first to fifth touch sensors TSA1, . . . , and TSA5 in column A may simultaneously differentially sense the adjacent touch electrodes in column A during the first sensing period.

Referring to Table B in FIG. 8B, a first touch sensor TSB1 in column B of the touch display device 200 according to embodiments of the present disclosure differentially senses the first touch electrode and the second touch electrode in column B during the first sensing period. Here, the first touch electrode in column B may be sensed as a sensing electrode, while the second touch electrode in column B may be sensed as a reference electrode.

In addition, during the first sensing period, a second touch sensor TSB2 in column B differentially senses the third touch electrode and the fourth touch electrode in column B. Here, the third touch electrode in column B may be sensed as a sensing electrode, while the fourth touch electrode in column B may be sensed as a reference electrode.

In addition, during the first sensing period, a third touch sensor TSB3 in column B differentially senses the fifth touch electrode and the sixth touch electrode in column B Here, the fifth touch electrode in column B may be sensed as a sensing electrode, while the sixth touch electrode in column B may be sensed as a reference electrode.

In addition, during the first sensing period, a fourth touch sensor TSB4 in column B differentially senses the seventh touch electrode and the eighth touch electrode in column B. Here, the seventh touch electrode in column B may be sensed as a sensing electrode, while the eighth touch electrode in column B may be sensed as a reference electrode.

In addition, during the first sensing period, a fifth touch sensor TSB5 in column B differentially senses the ninth touch electrode and the tenth touch electrode in column B. Here, the ninth touch electrode in column B may be sensed as a sensing electrode, while the tenth touch electrode in column B may be sensed as a reference electrode.

As described above, the first to fifth touch sensors TSB1, . . . , and TSB5 in column B may simultaneously differentially sense the adjacent touch electrodes in column B during the first sensing period.

Likewise, first to fifth touch sensors TSC1, . . . , and TSC5 in column C may differentially sense adjacent touch electrodes in column C during the first sensing period.

In the same manner, first to fifth touch sensors TSD1, . . . , and TSD5 in column D may differentially sense adjacent touch electrodes in column D during the first sensing period.

Accordingly, referring to FIGS. 8A and 8B, the touch display device according to embodiments of the present disclosure may simultaneously differentially sense the plurality of touch electrodes belonging to the first touch group GR1 and the second touch group GR2 during the first sensing period.

Referring to FIGS. 9A and 9B, a differential sensing method for adjacently-located touch electrodes in the touch display device 200 according to embodiments of the present disclosure, during a second sensing period, is illustrated.

Referring to FIG. 9A, the touch display device 200 according to embodiments of the present disclosure includes a first touch group GR1 comprised of second to fifth touch electrodes in column A, second to fifth touch electrodes in column B, second to fifth touch electrodes in column C, and second to fifth touch electrodes in column D. In addition, the touch display device 200 according to embodiments of the present disclosure includes a second touch group GR2 comprised of sixth to tenth touch electrodes in column A, sixth to tenth touch electrodes in column B, sixth to tenth touch electrodes in column C, and sixth to tenth touch electrodes in column D. In addition, the touch display device 200 according to embodiments of the present disclosure includes a third touch group GR3 comprised of eleventh touch electrodes in column A, eleventh touch electrodes in column B, eleventh touch electrodes in column C, and eleventh touch electrodes in column D.

Referring to Table A in FIG. 9B, a first touch sensor TSA1 in column A of the touch display device 200 according to embodiments of the present disclosure differentially senses the second touch electrode and the third touch electrode in column A during a second sensing period 2SP. Here, the second touch electrode in column A may be sensed as a sensing electrode "Sensing," while the third touch electrode in column A may be sensed as a reference electrode "Reference."

In addition, during the second sensing period 2SP, a second touch sensor TSA2 in column A differentially senses the fourth touch electrode and the fifth touch electrode in column A. Here, the fourth touch electrode in column A may be sensed as a sensing electrode, while the fifth touch electrode in column A may be sensed as a reference electrode.

In addition, during the second sensing period 2SP, a third touch sensor TSA3 in column A differentially senses the sixth touch electrode and the seventh touch electrode in column A. Here, the sixth touch electrode in column A may be sensed as a sensing electrode, while the seventh touch electrode in column A may be sensed as a reference electrode.

In addition, during the second sensing period 2SP, a fourth touch sensor TSA4 in column A differentially senses the eighth touch electrode and the ninth touch electrode in column A. Here, the eighth touch electrode in column A may be sensed as a sensing electrode, while the ninth touch electrode in column A may be sensed as a reference electrode.

In addition, during the second sensing period 2SP, a fifth touch sensor TSA5 in column A differentially senses the tenth touch electrode and the eleventh touch electrode in column A. Here, the tenth touch electrode in column A may be sensed as a sensing electrode, while the eleventh touch electrode in column A may be sensed as a reference electrode.

As described above, the first to fifth touch sensors TSA1, . . . , and TSA5 in column A may simultaneously differentially sense the adjacent touch electrodes in column A during the second sensing period.

Referring to Table B in FIG. 9B, a first touch sensor TSB1 in column B of the touch display device 200 according to embodiments of the present disclosure differentially senses the second touch electrode and the third touch electrode in column B during the second sensing period 2SP. Here, the second touch electrode in column B may be sensed as a sensing electrode, while the third touch electrode in column B may be sensed as a reference electrode.

In addition, during the second sensing period 2SP, a second touch sensor TSB2 in column B differentially senses the fourth touch electrode and the fifth touch electrode in column B. Here, the fourth touch electrode in column B may be sensed as a sensing electrode, while the fifth touch electrode in column B may be sensed as a reference electrode.

In addition, during the second sensing period 2SP, a third touch sensor TSB3 in column B differentially senses the sixth touch electrode and the seventh touch electrode in column B. Here, the sixth touch electrode in column B may be sensed as a sensing electrode, while the seventh touch electrode in column B may be sensed as a reference electrode.

In addition, during the second sensing period 2SP, a fourth touch sensor TSB4 in column B differentially senses the eighth touch electrode and the ninth touch electrode in column B. Here, the eighth touch electrode in column B may be sensed as a sensing electrode, while the ninth touch electrode in column B may be sensed as a reference electrode.

In addition, during the second sensing period 2SP, a fifth touch sensor TSB5 in column B differentially senses the tenth touch electrode and the eleventh touch electrode in column B Here, the tenth touch electrode in column B may be sensed as a sensing electrode, while the eleventh touch electrode in column B may be sensed as a reference electrode.

As described above, the first to fifth touch sensors TSB1, . . . , and TSB5 in column B may simultaneously differentially sense the adjacent touch electrodes in column B during the second sensing period.

Likewise, first to fifth touch sensors TSC1, . . . , and TSC5 in column C may differentially sense adjacent touch electrodes in column C during the second sensing period.

In the same manner, first to fifth touch sensors TSD1, . . . , and TSD5 in column D may differentially sense adjacent touch electrodes in column D during the second sensing period.

Accordingly, referring to FIGS. 9A and 9B, the touch display device according to embodiments of the present disclosure may simultaneously differentially sense the plurality of touch electrodes belonging to the first touch group GR1, the second touch group GR2, and the third touch group GR3 during the second sensing period.

Since all of the touch electrodes of the first touch group GR1 and the second touch group GR2 are differentially sensed as the sensing electrodes during the first sensing period and the second sensing period, as described above, raw touch data of all of the touch electrodes of the first touch group GR1 and the second touch group GR2 can be extracted during the first sensing period and the second sensing period.

Figure 10A:
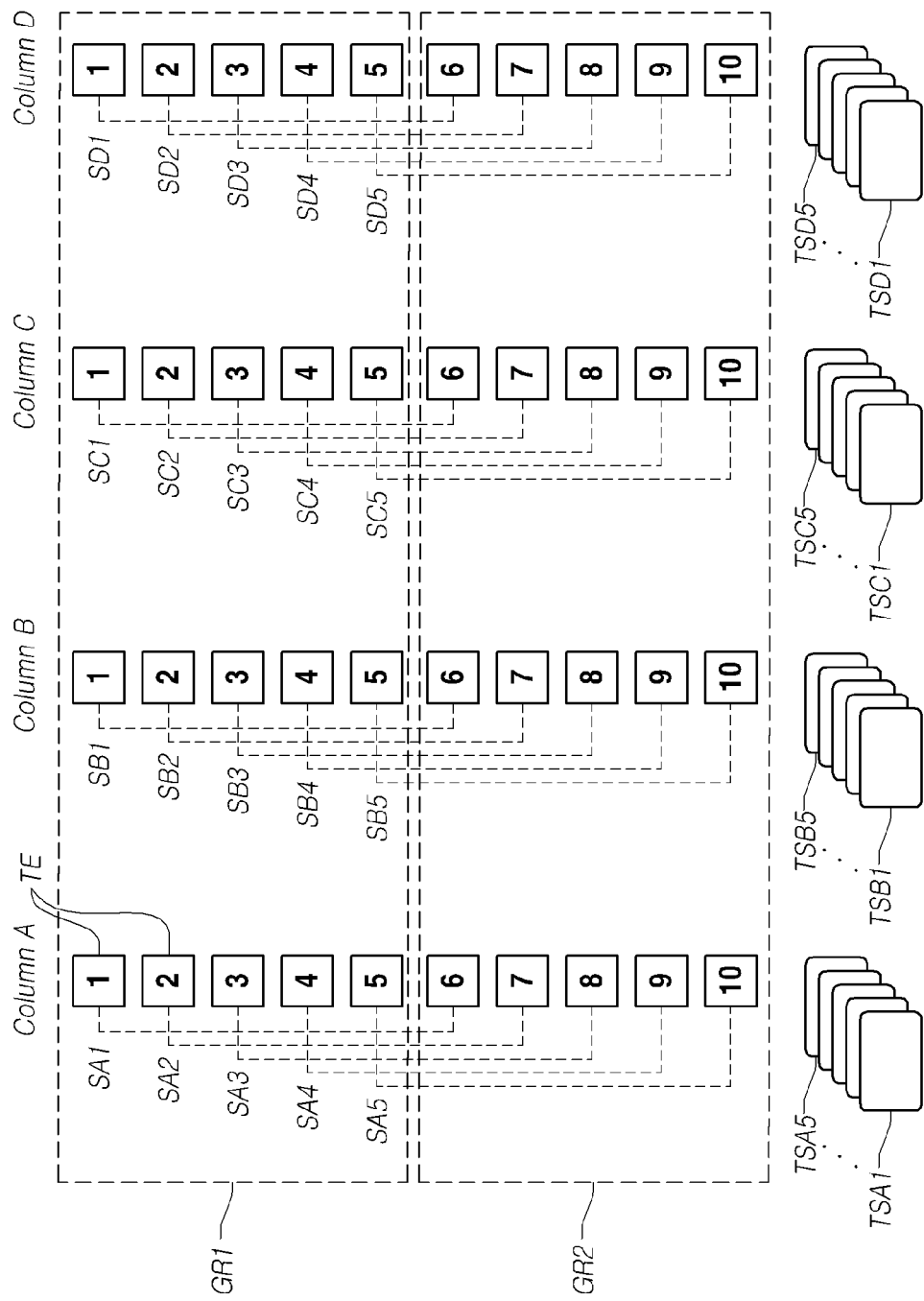
FIG. 10A schematically illustrates a differential sensing method for remotely-located touch electrodes during a first sensing period of the touch display device according to embodiments of the present disclosure.

Referring to FIGS. 10A and 10B, a differential sensing method for remotely-located touch electrodes during a first sensing period of the touch display device 200 according to embodiments of the present disclosure is illustrated.

In this case, the touch display device 200 according to embodiments of the present disclosure may extract raw touch data of the touch electrodes in the corresponding touch group by performing differential sensing on the remote touch electrodes, in which a shorter time may be taken than in the case of differential sensing performed on the adjacent touch electrodes. That is, since the touch electrodes in the touch group corresponding to the first sensing period are set as sensing touch electrodes, it is possible to extract raw touch data by performing sensing more rapidly than the method of differentially sensing the adjacent touch electrodes.

Referring to FIG. 10A, the touch display device 200 according to embodiments of the present disclosure includes a first touch group GR1 comprised of first to fifth touch electrodes in column A, first to fifth touch electrodes in column B, first to fifth touch electrodes in column C, and first to fifth touch electrodes in column D. In addition, the touch display device 200 includes a second touch group GR2 comprised of sixth to tenth touch electrodes in column A, sixth to tenth touch electrodes in column B, sixth to tenth touch electrodes in column C, and sixth to tenth touch electrodes in column D.

Referring to Table A in FIG. 10B, a first touch sensor TSA1 in column A of the touch display device 200 according to embodiments of the present disclosure differentially senses the first touch electrode and the sixth touch electrode in column A during a first sensing period 1SP. Here, the first touch electrode in column A may be sensed as a sensing electrode "Sensing," while the sixth touch electrode in column A may be sensed as a reference electrode "Reference."

In addition, during the first sensing period, a second touch sensor TSA2 in column A differentially senses the second touch electrode and the seventh touch electrode in column A. Here, the second touch electrode in column A may be sensed as a sensing electrode, while the seventh touch electrode in column A may be sensed as a reference electrode.

In addition, during the first sensing period, a third touch sensor TSA3 in column A differentially senses the third touch electrode and the eighth touch electrode in column A Here, the third touch electrode in column A may be sensed as a sensing electrode, while the eighth touch electrode in column A may be sensed as a reference electrode.

In addition, during the first sensing period, a fourth touch sensor TSA4 in column A differentially senses the fourth touch electrode and the ninth touch electrode in column A Here, the fourth touch electrode in column A may be sensed as a sensing electrode, while the ninth touch electrode in column A may be sensed as a reference electrode.

In addition, during the first sensing period, a fifth touch sensor TSA5 in column A differentially senses the fifth touch electrode and the tenth touch electrode in column A. Here, the fifth touch electrode in column A may be sensed as a sensing electrode, while the tenth touch electrode in column A may be sensed as a reference electrode.

As described above, the first to fifth touch sensors TSA1, . . . , and TSA5 in column A may simultaneously differentially sense the remote touch electrodes in column A during the first sensing period.

Referring to Table B in FIG. 10B, a first touch sensor TSB1 in column B of the touch display device 200 according to embodiments of the present disclosure differentially senses the first touch electrode and the sixth touch electrode in column B during the first sensing period. Here, the first touch electrode in column B may be sensed as a sensing electrode, while the sixth touch electrode in column B may be sensed as a reference electrode.

In addition, during the first sensing period, a second touch sensor TSB2 in column B differentially senses the second touch electrode and the seventh touch electrode in column B. Here, the second touch electrode in column B may be sensed as a sensing electrode, while the seventh touch electrode in column B may be sensed as a reference electrode.

In addition, during the first sensing period, a third touch sensor TSB3 in column B differentially senses the third touch electrode and the eighth touch electrode in column B Here, the third touch electrode in column B may be sensed as a sensing electrode, while the eighth touch electrode in column B may be sensed as a reference electrode.

In addition, during the first sensing period, a fourth touch sensor TSB4 in column B differentially senses the fourth touch electrode and the ninth touch electrode in column B Here, the fourth touch electrode in column B may be sensed as a sensing electrode, while the ninth touch electrode in column B may be sensed as a reference electrode.

In addition, during the first sensing period, a fifth touch sensor TSB5 in column B differentially senses the fifth touch electrode and the tenth touch electrode in column B. Here, the fifth touch electrode in column B may be sensed as a sensing electrode, while the tenth touch electrode in column B may be sensed as a reference electrode.

As described above, the first to fifth touch sensors TSB1, . . . , and TSB5 in column B may simultaneously differentially sense the remote touch electrodes in column B during the first sensing period.

Likewise, first to fifth touch sensors TSC1, . . . , and TSC5 in column C may differentially sense remote touch electrodes in column C during the first sensing period.

In the same manner, first to fifth touch sensors TSD1, . . . , and TSD5 in column D may differentially sense remote touch electrodes in column D during the first sensing period.

Accordingly, referring to FIGS. 10A and 10B, the touch display device according to embodiments of the present disclosure may simultaneously differentially sense the plurality of touch electrodes belonging to the first touch group GR1 and the second touch group GR2 during the first sensing period.

Referring to FIGS. 11A and 11B, a differential sensing method for remotely-located touch electrodes in the touch display device 200 according to embodiments of the present disclosure, during a second sensing period, is illustrated.

Referring to FIG. 11A, the touch display device 200 according to embodiments of the present disclosure includes a second touch group GR2 comprised of sixth to tenth touch electrodes in column A, sixth to tenth touch electrodes in column B, sixth to tenth touch electrodes in column C, and sixth to tenth touch electrodes in column D. In addition, the touch display device 200 includes a third touch group GR3 comprised of eleventh to fifteenth touch electrodes in column A, eleventh to fifteenth touch electrodes in column B, eleventh to fifteenth touch electrodes in column C, and eleventh to fifteenth touch electrodes in column D.

Referring to Table A in FIG. 11B, a first touch sensor TSA1 in column A of the touch display device 200 according to embodiments of the present disclosure differentially senses the sixth touch electrode in column A and the eleventh touch electrode in column A during a second sensing period 2SP. Here, the sixth touch electrode in column A may be sensed as a sensing electrode "Sensing," while the eleventh touch electrode in column A may be sensed as a reference electrode "Reference."

In addition, during the second sensing period, a second touch sensor TSA2 in column A differentially senses the seventh touch electrode in column A and the twelfth touch electrode in column A. Here, the seventh touch electrode in column A may be sensed as a sensing electrode, while the twelfth touch electrode in column A may be sensed as a reference electrode.

In addition, during the second sensing period 2SP, a third touch sensor TSA3 in column A differentially senses the eighth touch electrode in column A and the thirteenth touch electrode in column A. Here, the eighth touch electrode in column A may be sensed as a sensing electrode, while the thirteenth touch electrode in column A may be sensed as a reference electrode.

In addition, during the second sensing period 2SP, a fourth touch sensor TSA4 in column A differentially senses the ninth touch electrode in column A and the fourteenth touch electrode in column A. Here, the ninth touch electrode in column A may be sensed as a sensing electrode, while the fourteenth touch electrode in column A may be sensed as a reference electrode.

In addition, during the second sensing period 2SP, a fifth touch sensor TSA5 in column A differentially senses the tenth touch electrode in column A and the fifteenth touch electrode in column A. Here, the tenth touch electrode in column A may be sensed as a sensing electrode, while the fifteenth touch electrode in column A may be sensed as a reference electrode.

As described above, the first to fifth touch sensors TSA1, . . . , and TSA5 in column A may simultaneously differentially sense the remote touch electrodes in column A during the second sensing period.

Referring to Table B in FIG. 11B, a first touch sensor TSB1 in column B of the touch display device according to embodiments of the present disclosure differentially senses the sixth touch electrode in column B and the eleventh touch electrode in column B during the second sensing period. Here, the sixth touch electrode in column B may be sensed as a sensing electrode, while the eleventh touch electrode in column B may be sensed as a reference electrode.

In addition, during the second sensing period, a second touch sensor TSB2 in column B differentially senses the seventh touch electrode in column B and the twelfth touch electrode in column B. Here, the seventh touch electrode in column B may be sensed as a sensing electrode, while the twelfth touch electrode in column B may be sensed as a reference electrode.

In addition, during the second sensing period 2SP, a third touch sensor TSB3 in column B differentially senses the eighth touch electrode in column B and the thirteenth touch electrode in column B. Here, the eighth touch electrode in column B may be sensed as a sensing electrode, while the thirteenth touch electrode in column B may be sensed as a reference electrode.

In addition, during the second sensing period 2SP, a fourth touch sensor TSB4 in column B differentially senses the ninth touch electrode in column B and the fourteenth touch electrode in column B. Here, the ninth touch electrode in column B may be sensed as a sensing electrode, while the fourteenth touch electrode in column B may be sensed as a reference electrode.

In addition, during the second sensing period 2SP, a fifth touch sensor TSB5 in column B differentially senses the tenth touch electrode in column B and the fifteenth touch electrode in column B. Here, the tenth touch electrode in column B may be sensed as a sensing electrode, while the fifteenth touch electrode in column B may be sensed as a reference electrode.

As described above, the first to fifth touch sensors TSB1, . . . , and TSB5 in column B may simultaneously differentially sense the remote touch electrodes in column B during the second sensing period.

Likewise, first to fifth touch sensors TSC1, . . . , and TSC5 in column C may differentially sense adjacent touch electrodes in column C during the second sensing period.

In the same manner, first to fifth touch sensors TSC1, . . . , and TSC5 in column D may differentially sense adjacent touch electrodes of column D during the second sensing period.

Accordingly, referring to FIGS. 11A and 11B, the touch display device according to embodiments of the present disclosure may simultaneously differentially sense the plurality of touch electrodes belonging to the first touch group GR1 and the second touch group GR2 during the second sensing period.

Since all of the touch electrodes of the first touch group GR1 and the second touch group GR2 are differentially sensed as the sensing electrodes during the first sensing period and the second sensing period, as described above, raw touch data of all of the touch electrodes of the first touch group GR1 and the second touch group GR2 can be extracted during the first sensing period and the second sensing period.

Figure 12:
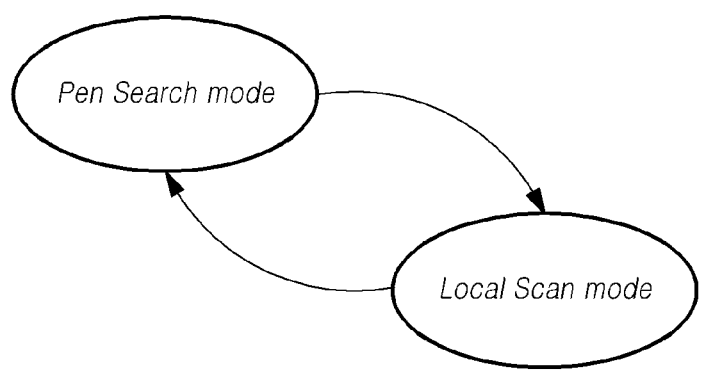
FIG. 12 schematically illustrates alternation between a pen search mode and a local scan mode in the touch display device according to embodiments of the present disclosure.

FIG. 12 is a diagram illustrating alternation between a pen search mode and a local scan mode in the touch display device 200 according to embodiments of the present disclosure. If a pen is detected in the pen search mode, after a predetermined time has elapsed, the operating mode of the touch display device according to embodiments of the present disclosure may be changed from the pen search mode to the local scan mode. In the pen search mode, the touch display device 200 may periodically or aperiodically (e.g., irregularly) search for the pen, i.e. the touch display device 200 periodically or aperiodically searches for a pen touch input performed using the pen adjacent to the touch display device 200. If the pen is detected, the touch display device 200 may enter the local scan mode to search the touch electrodes TE corresponding to a portion of the active area where the pen is detected more than other portions of the active area where the pen is not detected, and sense the position of the pen and information provided by the pen in the sensed portion of the active area.

In addition, if the position of the pen is not detected and an output signal of the pen is not sensed for a predetermined time during the local scan mode, the operating mode of the touch display device 200 according to embodiments of the present disclosure may return to the pen search mode. Here, if the pen is detected during the pen search mode, the operating mode of the touch display device 200 may be changed to the local scan mode again.

In addition, if a pen output signal is not detected but a finger touch signal is detected during the local scan mode, the operating mode of the touch display device 200 according to embodiments of the present disclosure may be changed to the pen search mode. In addition, if the pen output signal is continuously detected during the local scan mode, the touch display device 200 according to embodiments of the present disclosure may operate continuously in the local scan mode even in a case in which a finger touch signal is detected.

In addition, in the touch display device 200 according to embodiments of the present disclosure, a time or a number of times for sensing touch inputs performed using a finger in a predetermined time, e.g. during a single frame, in the local scan mode, may be smaller than a time or a number of times for sensing touch inputs performed using a finger in a predetermined time, e.g. during a single frame, in the pen search mode. That is, since more time may be required to detect the pen output signal in the local scan mode, more time may assigned for detecting the pen output signal, while relatively less time may be assigned for sensing the finger touch input.

In addition, since the time for detecting the pen output signal in the pen search mode is provided exclusively for searching for the pen, the touch display device 200 according to embodiments of the present disclosure may assign more time for sensing the finger touch input while assign relatively less time for detecting the pen output signal.

Figure 13:
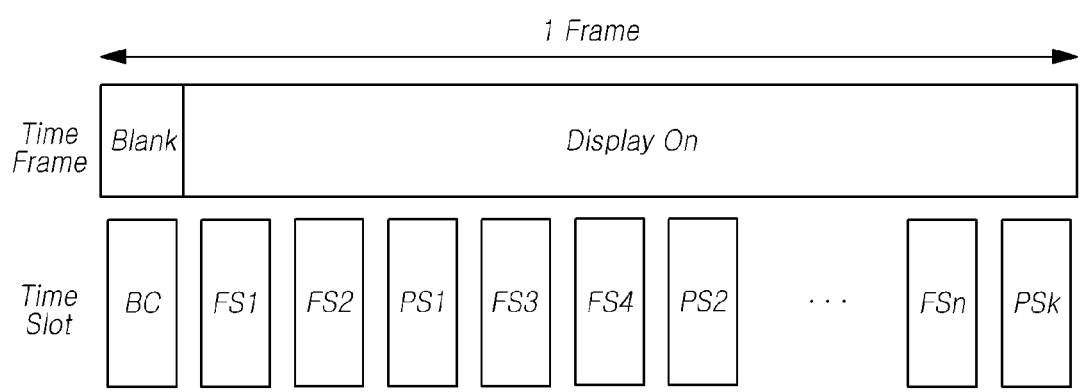
FIG. 13 schematically illustrates time slots according to time frames in the pen search mode of the touch display device according to embodiments of the present disclosure.

FIG. 13 is a diagram illustrating time slots in the pen search mode of the touch display device 200 according to embodiments of the present disclosure.

Referring to FIG. 13, in the touch display device 200, a single frame may be defined as including a display on section "Display On," in which an image is updated and displayed, and a blank section "Blank," in which no image is updated.

A pen communications information signal may be output during the blank section of the touch display device 200 according to embodiments of the present disclosure. The pen communications information signal may be output via the touch electrodes disposed in the display panel DP to transmit the pen communications information signal to the pen.

In addition, a common voltage may be applied to the touch electrodes of the touch display device 200 during the display on section. That is, the touch electrodes may act not only as touch electrodes to sense touch inputs, but also as common electrodes to display images. Here, the touch display device 200 may simultaneously display images and sense touch inputs. That is, the touch electrodes may simultaneously act as the touch electrodes to sense touches while acting as the common electrodes.

Although not shown in the drawings, the touch display device 200 according to embodiments of the present disclosure may operate in divided periods, i.e. a period in which the touch electrodes act as the common electrodes and in a period in which the touch electrodes act as the touch-sensing touch electrodes. That is, driving may be performed in an image display period and a touch sensing period, which are divided by a time division scheme.

Referring to FIG. 13, during the pen search mode of the touch display device 200, the time slots of the display on section may include pen sensing sections PS1, PS2, ..., and PSk, in which the pen output signal is detected. In addition, during the pen search mode, the time slots of the display on section may include finger sensing sections FS1, FS2, ..., and FSn, in which the finger touch input is detected.

In the touch display device 200 according to embodiments of the present disclosure, during the pen search mode, the image on section may include the plurality of pen sensing sections PS1, PS2, ..., and PSk and the plurality of finger sensing sections FS1, FS2, ..., and FSn, which are divided by a time division scheme.

In addition, in the touch display device 200 according to embodiments of the present disclosure, during the pen search mode, the display on section may include more finger sensing sections FS1, FS2, ..., and FSn than the pen sensing sections PS1, PS2, ..., and PSk, which are divided by the time division scheme. This may reduce a touch report period for finger sensing.

In addition, in the touch display device 200 according to embodiments of the present disclosure, during the pen search mode, the display on section may include more pen sensing sections PS1, PS2, ..., and PSk than the finger sensing sections FS1, FS2, ..., and FSn, which are divided by the time division scheme. This may increase the frequency of pen sensing, thereby more rapidly locating the pen.

Figure 14:
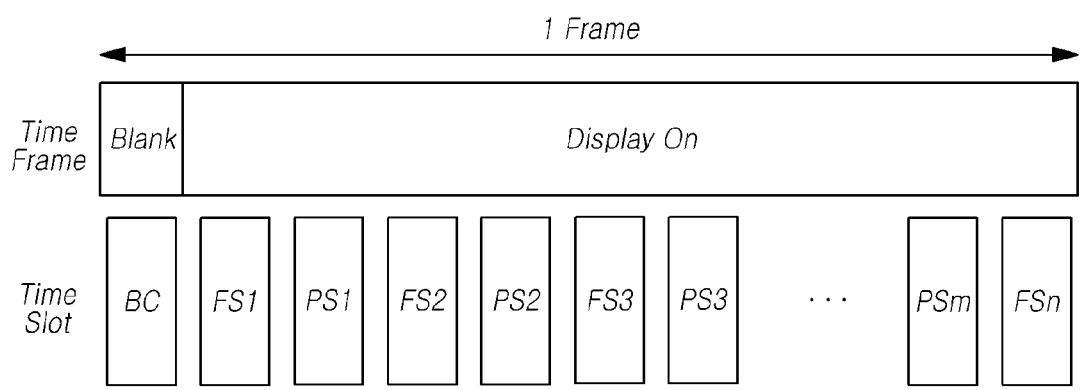
FIG. 14 schematically illustrates time slots according to time frames in the local scan mode of the touch display device according to embodiments of the present disclosure.

FIG. 14 is a diagram illustrating time slots in the local scan mode of the touch display device 200 according to embodiments of the present disclosure.

Referring to FIG. 14, during the local scan mode of the touch display device 200, the display on section may include pen sensing sections PS1, PS2, ..., and PSm, in which the pen output signal is detected. In addition, during the local scan mode, the time slots of the display on section may include finger sensing sections FS1, FS2, ..., and FSn, in which the finger touch input is detected.

In the touch display device 200 according to embodiments of the present disclosure, during the local scan mode, the display on section may include the plurality of pen sensing sections PS1, PS2, ..., and PSm and the plurality of finger sensing sections FS1, FS2, ..., and FSn, which are divided by the time division scheme.

In addition, in the touch display device 200 according to embodiments of the present disclosure, the display on section during the local scan mode may include more finger sensing sections FS1, FS2, ..., and FSn than the pen sensing sections PS1, PS2, ..., and PSm, which are divided by the time division scheme. This may reduce a touch report period for finger sensing.

In addition, in the touch display device 200 according to embodiments of the present disclosure, during the local scan mode, the display on section may include more pen sensing sections PS1, PS2, ..., and PSm than the finger sensing sections FS1, FS2, ..., and FSn, which are divided by the time division scheme. This may increase the frequency of pen sensing, thereby more rapidly locating the pen.

In the touch display device 200 according to embodiments of the present disclosure, during the local scan mode, the plurality of pen sensing sections PS1, PS2, ..., and PSm may include a section in which a position of the pen is sensed, a section in which an inclination of the pen is sensed, a section in which pressure information of the pen is sensed, a section in which pen state information output by the pen is sensed, and the like. In addition, the section in which a position of the pen is sensed, the section in which an inclination of the pen is sensed, the section in which pressure information of the pen is sensed, and the section in which pen state information output by the pen is sensed may be performed in different sections or may be simultaneously performed in the same section.

In the touch display device 200 according to embodiments of the present disclosure, the number of the plurality of pen sensing sections PS1, PS2, ..., and PSm, performed during the local scan mode, may be greater than the number of the plurality of pen sensing sections PS1, PS2, ..., and PSk, performed during the pen search mode. That is, since the touch display device 200 must sense not only the position of the pen, but also various pieces of information output by the pen, during the local scan mode, more pen sensing sections PS1, PS2, ..., and PSm may be assigned during the local scan mode than the pen sensing sections PS1, PS2, ..., and PSk assigned during the pen search mode.

Figure 15:
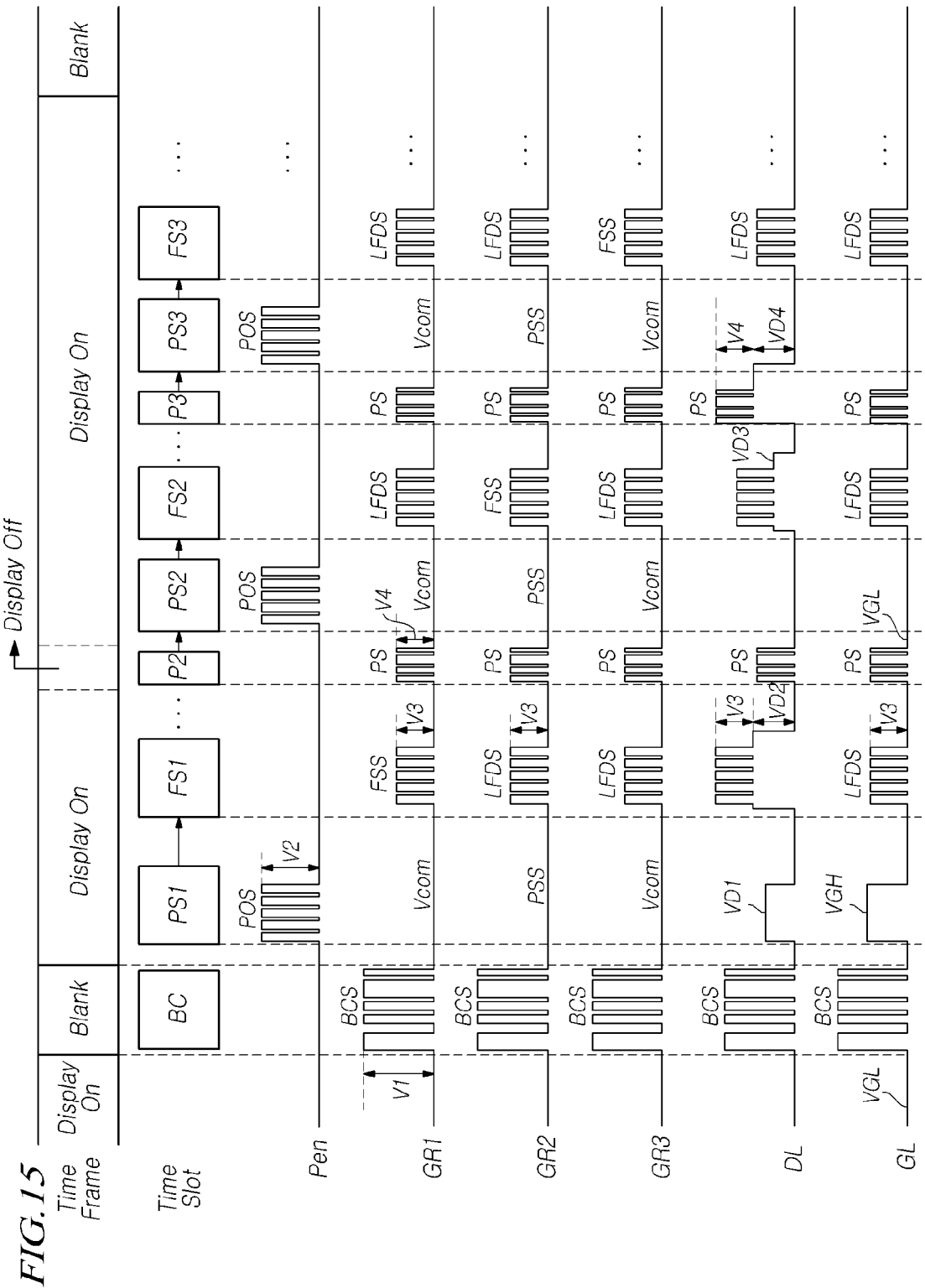
FIG. 15 schematically illustrates a pen output signal, touch group-specific output signals, a data line output signal, and a gate line output signal according to the time slots in the pen search mode or the local scan mode of the touch display device according to embodiments of the present disclosure.

FIG. 15 is a schematic diagram illustrating a pen output signal, touch group-specific output signals, a data line output signal, and a gate line output signal according to the time slots in the pen search mode or the local scan mode of the touch display device 200 according to embodiments of the present disclosure.

In the pen search mode or the local scan mode of the touch display device 200 according to embodiments of the present disclosure, states and output signals of the pen, the touch groups GR1, GR2, and GR3 of the touch electrodes, the data lines DL, and the gate lines GL will be described hereinafter.

Although the time slots of the touch display device 200 according to embodiments of the present disclosure may be set in the sequence illustrated in FIG. 15, the sequence of the time slots may be changed as required for the touch display device 200. Hereinafter, a description will be provided with reference to FIG. 15.

BC Section

A beacon (BC) section of the touch display device 200 according to embodiments of the present disclosure may be performed during the blank section. The BC section is used as a section in which the pen receives the pen communications information signal BCS for communication with the display panel DP.

During the BC section, the pen operates in a signal receiving mode to receive the pen communications information signal BCS. The pen communications information signal BCS may include information, based on which the pen and the display panel DP communicate. That is, the pen communications information signal BCS may include a driving frequency of the pen, the number of pulses of the pen output signal, definition of each of the time slots of the display panel DP, and the like.

During the BC section, the pen communications information signal BCS may be output by the touch power supply TPIC, transferred to the first touch group GR1, the second touch group GR2, and the third touch group GR3 of the plurality of touch electrodes, and emitted and output from the display panel DP. Here, the pen communications information signal BCS may be a signal swinging with a first voltage level V1.

During the BC section, the pen communications information signal BCS may be a signal based on a communications method, such as direction sequence spread spectrum (DSSS) or frequency hopping spread spectrum (FHSS).

During the BC section, the plurality of data lines DL disposed in the display panel DP may have a signal swinging with a first voltage level V1, the same as the voltage level of the pen communications information signal BCS. Likewise, the plurality of gate lines GL disposed in the display panel DP may have a signal swinging with a first voltage level V1 with respect to a low gate voltage VGL, the first voltage level V1 being the same as the voltage level of the pen communications information signal BCS. In this case, in the pen communications information signal BCS output from the display panel DP, a signal delay or power drop may be prevented. That is, it is possible to reduce or prevent parasitic capacitance between the plurality of touch groups and the plurality of data lines DL by providing the data lines DL or the gate lines GL with the same voltage change as in the pen communications information signal BCS applied to the plurality of touch groups GR1, GR2, and GR3.

In the touch display device 200 according to other embodiments of the present disclosure, during the BC section, the plurality of data lines DL disposed in the display panel DP may be set to have a floating state, a predetermined direct current (DC) or alternating current (AC) voltage, or the like. In addition, the gate lines GL may be set to have a floating state, a predetermined DC or AC voltage, or the like. In this case, it is possible to reduce consumption of power by controlling signals applied to the plurality of data lines DL or the plurality of gate lines GL during the BC section.

PS1 and FS1 Sections

Hereinafter, a first pen sensing section PS1 and a first finger sensing section FS1 of the touch display device 200 according to embodiments of the present disclosure will be described with reference to FIG. 15.

The first pen sensing section PS1 is performed during the display on section "Display On." Here, the first pen sensing section PS1 may start without the pen synchronization signal PS. In such a case, the first pen sensing section PS1 may be driven, synchronized from the pen communications information signal BCS. The pen sensing section PS1 may be used as a section in which the position of the pen is sensed, and/or the inclination or the like of the pen is sensed, the pen state information output by the pen is sensed.

During the first pen sensing section PS1, the pen operates in an output mode to output a pen output signal POS. The pen output signal POS may be a voltage signal that changes while swinging with a second voltage level V2. Here, the pen output signal POS may be set to have the same frequency as a touch sensor operation frequency so as to be sensed by the touch sensors TS.

During the first pen sensing section PS1, a common voltage Vcom may be output by the touch power supply TPIC and be applied to the first touch group GR1 and the third touch group GR3. If the pen is located in the second touch group GR2, the pen sensing signal PSS is applied to the second touch group GR2, so that the pen output signal POS can be sensed. Here, the pen sensing signal PSS may be a preset DC voltage or a voltage, such as the common voltage Vcom. Since the pen output signal POS output by the pen is a signal, the voltage level of which changes, the touch sensor TS may sense the pen output signal POS while maintaining a reference value set as a DC voltage.

During the first pen sensing section PS1, if the pen sensing signal PSS and the common voltage Vcom are set to have the same voltage, the plurality of data lines DL disposed in the display panel DP are set to maintain an image voltage VD1 or an original voltage level, and the plurality of gate lines GL disposed in the display panel DP may be set to maintain a gate high voltage VGH or a gate low voltage VGL. In addition, if the pen sensing signal PSS and the common voltage Vcom are not the same voltage, the plurality of data lines DL may be set to have a signal obtained by adding a difference between the pen sensing signal PSS and the common voltage Vcom to the image voltage VD1. For example, when the pen sensing signal PSS is applied to sense the second touch group GR2, the second touch group GR2 may cause voltage changes in the pixel electrodes PE by amounts equal to voltage changes in the common electrodes CE corresponding to the second touch group GR2, so that an image to be display may be maintained. In addition, if the pen sensing signal PSS and the common voltage Vcom are not the same voltage, the plurality of gate lines GL may be set to have a signal obtained by adding a difference between the pen sensing signal PSS and the common voltage Vcom to the gate high voltage VGH or the gate low voltage VGL, or may be set to have an original voltage level.

The first finger sensing section FS1 is performed during the display on section "Display On." The first finger sensing section FS1 is used as a period in which a touch input performed using a finger or the like is sensed.

During the first finger sensing section FS1, the pen operates in a receiving mode to receive signals from an external source or operates in a standby state.

During the first finger sensing section FS1, the load reducing signal LFDS may be output by the touch power supply TPIC to be applied to the second touch group GR2 and the third touch group GR3. A finger sensing signal FSS may be output by the touch power supply TPIC to be applied to the first touch group GR1, allowing the touch sensors TS to sense a touch input, performed by a finger or the like. Here, the finger sensing signal FSS may be a voltage changing while swinging with a third voltage level. The load reducing signal LFDS may have the same voltage as the finger sensing signal FSS. That is, the load reducing signal LFDS may be a signal having the same frequency, amplitude, and phase as the finger sensing signal FSS. Here, the signals may be regarded the same as long as the signals generate an intended effect even if the signals are not completely the same. That is, signals for reducing parasitic capacitance that would occur around the first touch group GR1 involved in sensing may be regarded as being suitable (or as being the same signals) In other words, it is possible to prevent parasitic capacitance in the first touch group GR1 involved in sensing by applying the load reducing signal LFDS to the second touch group GR2 and the third touch group GR3, none of which is involved in sensing.

During the first finger sensing section FS1, the plurality of data lines DL disposed in the display panel DP may be set to have a voltage VD2+V3 obtained by adding a variation V3 of the finger sensing signal FSS to an image voltage VD2. That is, a voltage applied to the plurality of data lines DL, during changing of the finger sensing signal FSS swinging with the third voltage level, may be set as a voltage obtained by adding a level swinging and changing by the third voltage level to the DC image voltage VD2. Thus, while the common electrodes CE corresponding to the second touch group GR2 are being subjected to a voltage level change due to the finger sensing signal FSS applied to the second touch group GR2, the data lines DL may be subjected to the same voltage level change as the common electrodes CE, so that an image display voltage level may be maintained between the pixel electrodes PE and the common electrodes CE. In addition, since the plurality of data lines DL are set to have the voltage VD2+V3 obtained by adding the variation V3 of the finger sensing signal FSS to the image voltage VD2, parasitic capacitance that would otherwise occur in the second touch group GR2 involved in sensing and the surroundings the second touch group GR2 may be reduced.

During the first finger sensing section FS1, the plurality of gate lines GL disposed in the display panel DP may be set to have a voltage VGL+V3 obtained by adding the variation V3 of the finger sensing signal FSS to the gate low voltage VGL. That is, a voltage applied to the plurality of gate lines GL, during changing of the finger sensing signal FSS swinging with the third voltage level, is set to have a voltage obtained by adding a level swinging and changing by the third voltage level to the DC gate low voltage VGL. Since the plurality of gate lines GL are set to have the voltage VGL+V3 obtained by adding the variation V3 of the finger sensing signal FSS to the gate low voltage VGL, parasitic capacitance that would otherwise occur in the second touch group GR2 involved in sensing and the surroundings of the second touch group GR2 may be reduced.

P2, PS2, and FS2 Sections

Hereinafter, a pen synchronization signal section P2, a second pen sensing section PS2, and a second finger sensing section FS2 of the touch display device 200 according to embodiments of the present disclosure will be described with reference to FIG. 15. In the following, descriptions of specific features will be omitted when they are the same as those described above in relation to the first pen sensing section PS1 and the first finger sensing section FS1.

The second pen synchronization signal section P2 may be performed during a display off section "Display Off." The second pen synchronization signal section P2 is used as a section in which the pen receives a synchronization signal for communication with the display panel DP.

During the second pen synchronization signal section P2, the pen operates in a signal receiving mode to receive the pen synchronization signal PS. The pen synchronization signal PS may include synchronization information, based on which the pen and the display panel DP communicate.

During the second pen synchronization signal section P2, the pen synchronization signal PS may be output by the touch power supply TPIC, transferred to the first touch group GR1, the second touch group GR2, and the third touch group GR3, and output from the display panel DP. Here, the pen synchronization signal PS may be a swinging signal having a fourth voltage level V4.

During the second pen synchronization signal section P2, the pen synchronization signal PS may be output by the touch power supply TPIC to be applied to the plurality of data lines DL disposed in the display panel DP. Here, since the display panel DP is set to have the display off section, the pen synchronization signal PS may be applied to the data lines DL.

In addition, during the second pen synchronization signal section P2, the pen synchronization signal PS may be output by the touch power supply TPIC to be applied to the plurality of gate lines GL disposed in the display panel DP. Here, since the display panel DP is set to have the display off section, the pen synchronization signal PS applied to the gate lines GL may be a signal swinging having the fourth voltage level V4 with respect to the gate low voltage VGL. As described above, the driving transistors disposed in the pixel areas PXA within the display panel DP may be maintained in a turn-off state.

Descriptions of the operation of the pen, the operation of the first touch group GR1, the second touch group GR2, and the third touch group GR3, and the operation of the data lines DL and the gate lines GL during the second pen sensing section PS2 will be omitted, since they are the same as those during the above-described first pen sensing section PS1.

In addition, descriptions of the operation of the pen, the operation of the first touch group GR1, the second touch group GR2, and the third touch group GR3, and the operation of the data lines DL and the gate lines GL during the second finger sensing section FS2 will be omitted, since they are the same as those during the above-described first finger sensing section FS1, except for the touch groups involved in sensing.

P3, PS3, and FS3 Sections

Hereinafter, a pen synchronization signal section P3, a third pen sensing section PS3, and a third finger sensing section FS3 of the touch display device 200 according to embodiments of the present disclosure will be described with reference to FIG. 15. In the following, descriptions of specific features will be omitted when they are the same as those described above in relation to the second pen synchronization signal section P2, the second pen sensing section PS2, and the second finger sensing section FS2.

The third pen synchronization signal section P3 may be performed during a display on section "Display On." The third pen synchronization signal section P3 is used as a section in which the pen receives a synchronization signal for communication with the display panel DP.

During the third pen synchronization signal section P3, the pen operates in the signal receiving mode to receive the pen synchronization signal PS. The pen synchronization signal PS may include synchronization information, based on which the pen and the display panel DP communicate.

During the third pen synchronization signal section P3, the pen synchronization signal PS may be output by the touch power supply TPIC, transferred to the first touch group GR1, the second touch group GR2, and the third touch group GR3, and output from the display panel DP. Here, the pen synchronization signal PS may be a signal swinging with the fourth voltage level V4.

During the third pen synchronization signal section P3, the plurality of data lines DL disposed in the display panel DP may be set to have a voltage VD4+V4 obtained by adding a variation V4 of the pen synchronization signal PS to an image voltage VD4. That is, a voltage applied to the plurality of data lines DL, during changing of the pen synchronization signal PS swinging with the fourth voltage level, may be set as a voltage obtained by adding a level swinging and changing by the fourth voltage level to the DC image voltage VD4. Thus, while the common electrodes CE corresponding to the plurality of touch groups are being subjected to a voltage level change due to the pen synchronization signal PS applied to the plurality of touch groups, the data lines DL may be subjected to the same voltage level change as the common electrodes CE, so that an image display voltage level may be maintained between the pixel electrodes PE and the common electrodes CE. In addition, since the plurality of data lines DL are set to have the voltage VD4+V4 obtained by adding the variation V4 of the pen synchronization signal PS to the image voltage VD4, the pen synchronization signal PS output by the plurality of groups may be transferred to the pen without signal delay.

During the third pen synchronization signal section P3, the plurality of gate lines GL disposed in the display panel DP may be set to have the voltage VGL+V4 or VGH+V4 obtained by adding the variation V4 of the pen synchronization signal PS to the gate low voltage VGL or the gate high voltage VGH. That is, a voltage applied to the plurality of gate lines GL, during changing of the pen synchronization signal PS swinging with the third voltage level, is set to have a voltage obtained by adding a level swinging and changing by the fourth voltage level to the DC gate low voltage VGL or the DC gate high voltage VGH. Since the plurality of gate lines GL are set to have the voltage VGL+V4 or VGH+V4 obtained by adding the variation V4 of the pen synchronization signal PS to the gate low voltage VGL or the gate high voltage VGH, the pen synchronization signal PS output by the plurality of groups may be transferred to the pen without signal delay.

Descriptions of the operation of the pen, the operation of the first touch group GR1, the second touch group GR2, and the third touch group GR3, and the operation of the data lines DL and the gate lines GL during the third pen sensing section PS3 will be omitted, since they are the same as those during the above-described second pen sensing section PS2.

In addition, descriptions of the operation of the pen, the operation of the first touch group GR1, the second touch group GR2, and the third touch group GR3, and the operation of the data lines DL and the gate lines GL during the third finger sensing section FS3 will be omitted, since they are the same as those during the above-described second finger sensing section FS2, except for the touch groups involved in sensing.

Figure 16:
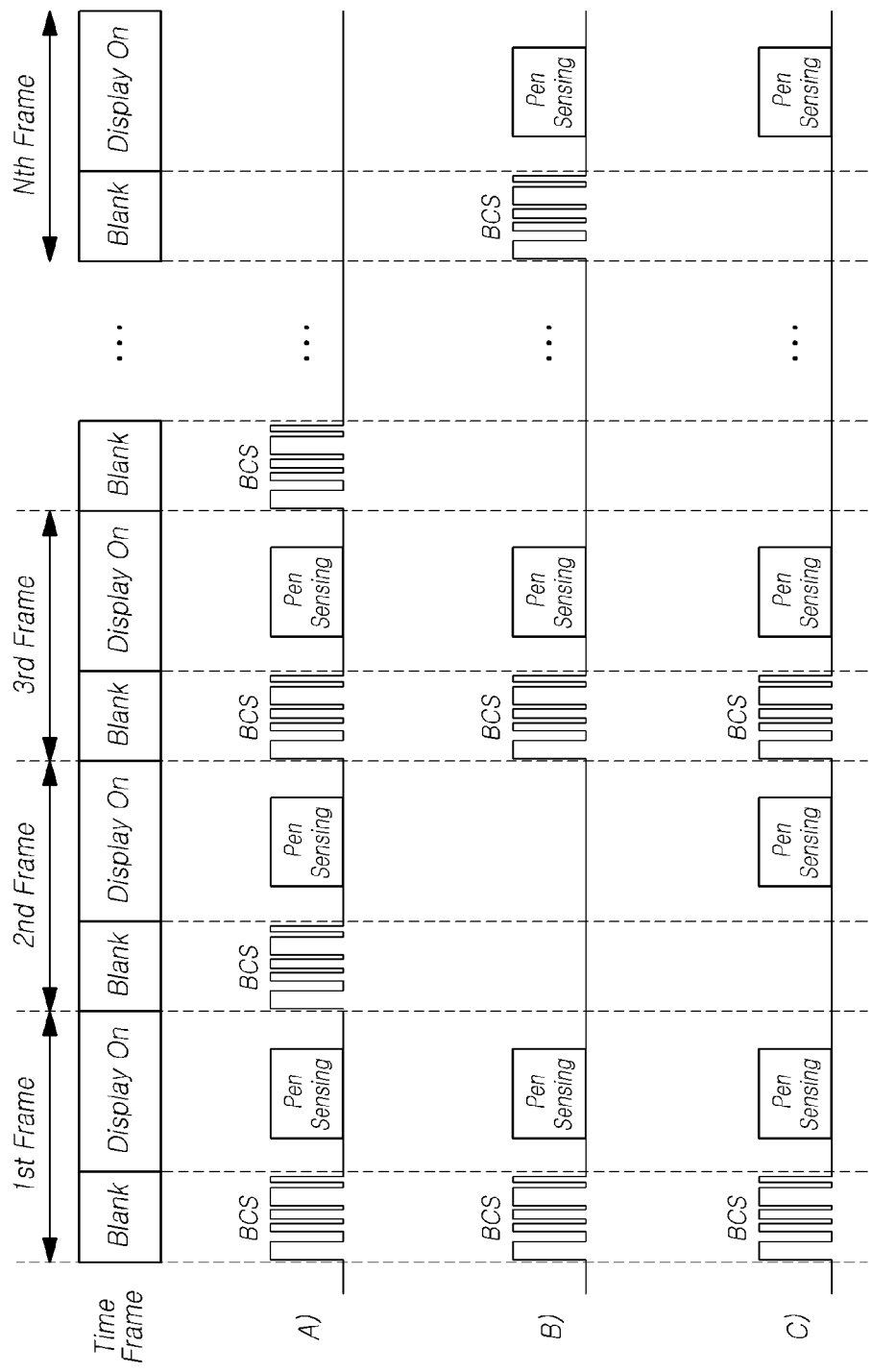
FIG. 16 schematically illustrates output timing of a pen communications information signal according to the time slots in the touch display device according to embodiments of the present disclosure.

FIG. 16 is a schematic diagram illustrating output timing of the pen communications information signal BCS according to the time slots in the touch display device 200 according to embodiments of the present disclosure.

Referring to FIG. 16, in the pen search mode, the touch display device 200 according to embodiments of the present disclosure may have blank sections in which the pen communications information signal BCS is not output. Referring to timing A of FIG. 16, the pen communications information signal BCS is not output during the blank section of the last frame "Nth Frame" during a predetermined period. In this case, it is possible to reduce consumption of power of the touch display device 200 by reducing the number of outputs of pen communications information signal BCS.

In addition, referring to timing B of FIG. 16, the pen communications information signal BCS may not be output in predetermined periods. In an example, the pen communications information signal BCS may not be output in an even frame or may not be output in an odd frame. In another example, the pen communications information signal BCS may be output only in fifteen (15) frames equal to 25% of sixty (60) frames of the touch display device 200. Alternatively, the pen communications information signal BCS may be output or not output only in frames corresponding to multiples of four (4).

The touch display device 200 according to further embodiments of the present disclosure may aperiodically output the pen communications information signal BCS. When the pen communications information signal BCS is repeatedly and periodically output, electromagnetic interference (EMI) components may be significant in a specific frequency band. This may have an effect not only on the operation of the touch display device 200, but also on surrounding electric devices. Accordingly, it is possible to reduce EMI by setting the touch display device 200 such that the pen communications information signal BCS is aperiodically output or the output frequency of the pen communications information signal BCS is variable. Alternatively, the pen communications information signal BCS may be set to be randomly output within a predetermined range.

The touch display device 200 according to further embodiments of the present disclosure may be set such that the pen output signal POS may be sensed even in sections in which the pen communications information signal BCS is not output. That is, referring to timing C of FIG. 16, the pen output signal POS may be sensed in the second frame "2nd Frame" and the nth frame "Nth Frame" in which the pen output signal POS is not output. In this case, the sensitivity of pen sensing of the touch display device 200 can be improved.

Although not shown in FIG. 16, in the touch display device 200 according to embodiments of the present disclosure, during blank sections of the frames in which the pen communications information signal BCS is not output, the plurality of data lines DL disposed in the display panel DP may be set to have a floating state or a predetermined DC or AC voltage. In addition, in the same manner, the gate lines GL may be set to have a floating state or a predetermined DC or AC voltage.

Figure 17:
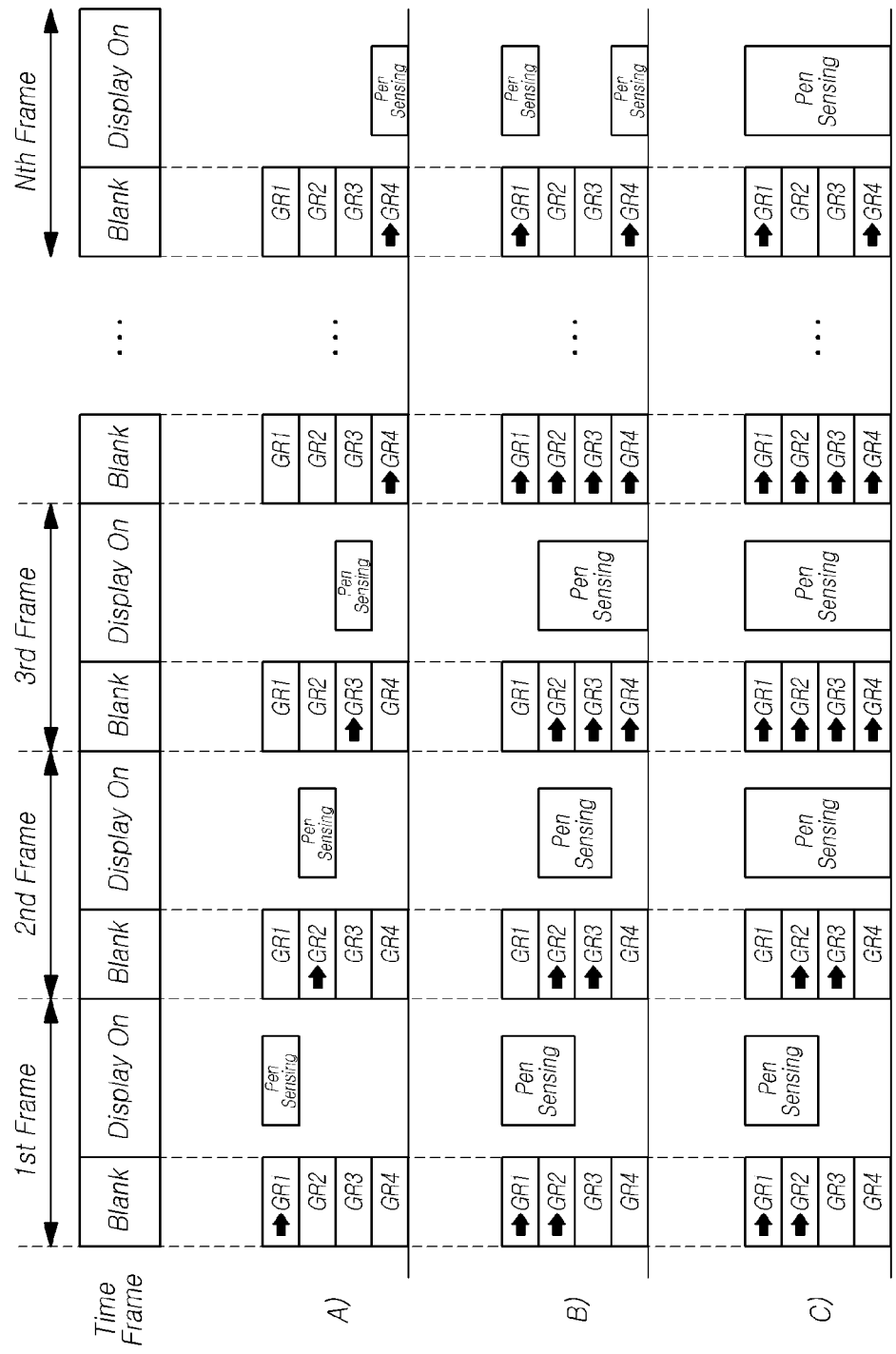
FIG. 17 schematically illustrates touch group-specific output timing of the pen communications information signal according to the time slots in the pen search mode of the touch display device according to embodiments of the present disclosure.

FIG. 17 is a schematic diagram illustrating touch group-specific output timing of the pen communications information signal BCS according to the time slots in the pen search mode of the touch display device 200 according to embodiments of the present disclosure.

Referring to FIG. 17, in the pen search mode, the touch display device 200 according to embodiments of the present disclosure may have a touch group to which the pen communications information signal BCS is not output. Referring to timing A of FIG. 17, the pen communications information signal BCS may be applied, in a predetermined sequence, to specific touch groups requiring the pen communications information signal BCS to be output thereto. In this case, consumption of power of the touch display device 200 may be reduced, since it is not necessary to output the pen communications information signal BCS to all touch groups of the display panel DP. Here, sensing of the pen output signal POS may be performed for the touch group to which the pen communications information signal BCS is output.

In addition, referring to timing B of FIG. 17, the pen communications information signal BCS may be output only to predetermined touch groups and only in a predetermined number of touch groups. For example, in the first frame "1st Frame," the pen communications information signal BCS is output only to the first touch group GR1 and the second touch group GR2. In the second frame "2nd Frame," the pen communications information signal BCS is output only to the second touch group GR2 and the third touch group GR3. In addition, in the third frame "3rd Frame," the pen communications information signal BCS is output only to the third touch group GR3 and the fourth touch group GR4. If the pen is located on the second touch group GR2, the pen may be sensed by outputting the pen communications information signal BCS to the second touch group GR2 in continuous frames, thereby improving the sensitivity of pen sensing. In addition, in a predetermined frame, the pen communications information signal BCS may be output to all touch groups.

The touch display device 200 according to further embodiments of the present disclosure may be set such that the pen output signal POS can be sensed from a touch group to which the pen communications information signal BCS is not output. That is, referring to timing C of FIG. 17, in the second frame "2nd Frame," the pen output signal POS is sensed from the first touch group GR1 and the fourth touch group GR4 to which the pen communications information signal BCS is not output. In this case, the sensitivity of pen sensing of the touch display device 200 can be improved.

Although not shown in FIG. 17, in the touch display device 200 according to embodiments of the present disclosure, during the blank section in which the pen communications information signal BCS is output, the plurality of data lines DL disposed in the display panel DP may be set to have a floating state, a predetermined DC or AC voltage, or the like. In addition, the plurality of gate lines GL may also be set to have a floating state, a predetermined DC or AC voltage, or the like.

In addition, although not shown in FIG. 17, in the touch display device 200 according to embodiments of the present disclosure, during the blank section in which the pen communications information signal BCS is output, a signal the same as the pen communications information signal BCS may be applied to the plurality of data lines DL disposed in the display panel DP. In addition, a signal the same as the pen communications information signal BCS may be applied to the gate lines GL.

In the touch display device 200 according to other embodiments of the present disclosure, during the blank section in which the pen communications information signal BCS is output, a signal the same as the pen communications information signal BCS may be applied to data lines DL, among the plurality of data lines DL disposed in the display panel DP, corresponding to the touch group to which the pen communications information signal BCS is output. In addition, a signal the same as the pen communications information signal BCS may be applied to gate lines GL, among the plurality of gate lines GL, corresponding to the touch group to which the pen communications information signal BCS is output.

Figure 18:
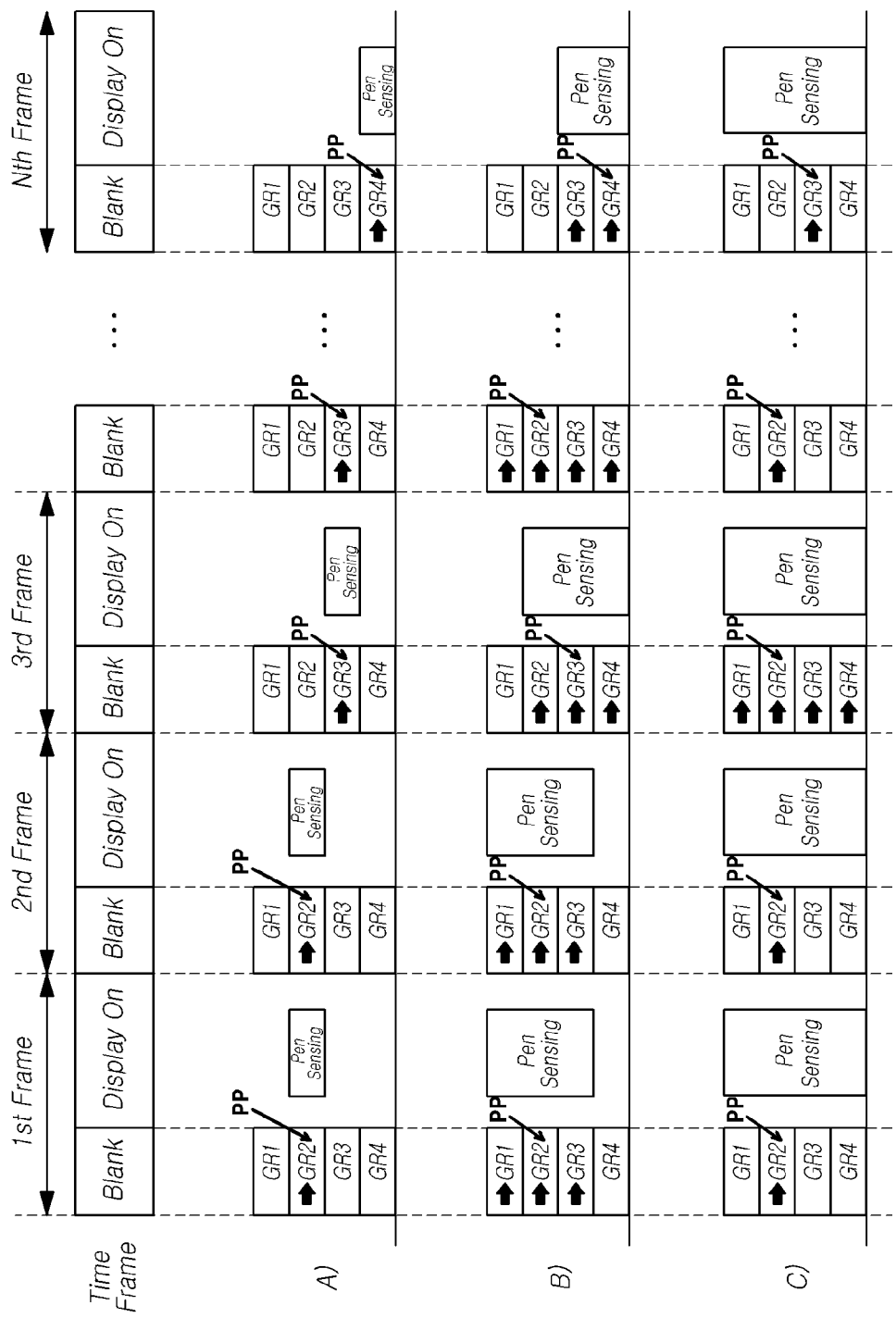
FIG. 18 schematically illustrates touch group-specific output timing of the pen communications information signal according to the time slots in local scan mode of the touch display device according to embodiments of the present disclosure.

FIG. 18 is a schematic diagram illustrating touch group-specific output timing of the pen communications information signal according to the time slots in local scan mode of the touch display device 200 according to embodiments of the present disclosure.

Referring to timing A of FIG. 18, when the pen position PP changes at every frame, the touch display device 200 according to embodiments of the present disclosure may predict the changing position and output the pen communications information signal BCS to a touch group in the corresponding position. Here, the changing pen position PP may be predicted by previously calculating the speed, direction, and the like of the movement of the pen, using algorithmic computation.

Referring to timing B of FIG. 18, the touch display device according to embodiments of the present disclosure may be set such that the pen communications information signal BCS may be output not only to a touch group on which the pen is located, but also adjacent touch groups, when the pen position PP changes at every frame. In this case, the possibility that the pen receive the pen communications information signal BCS can be increased, thereby improving the sensitivity of pen sensing.

The touch display device 200 according to further embodiments of the present disclosure may be set such that the pen output signal POS may be sensed from a touch group to which the pen communications information signal BCS is not output. That is, referring to timing C of FIG. 18, in the first frame "1st Frame," the pen output signal POS is sensed from the first touch group GR1, the third touch group GR3, and the fourth touch group GR4 to which the pen communications information signal BCS is not output. In this case, the sensitivity of pen sensing of the touch display device 200 can be improved.

Although not shown in FIG. 18, in the touch display device 200 according to embodiments of the present disclosure, during the blank section in which the pen communications information signal BCS is output, the plurality of data lines DL disposed in the display panel DP may be set to have a floating state, a predetermined DC or AC voltage, or the like. In addition, the plurality of gate lines GL may also be set to have a floating state, a predetermined DC or AC voltage, or the like.

Although not shown in FIG. 18, in the touch display device 200 according to embodiments of the present disclosure, during the blank section in which the pen communications information signal BCS is output, a signal the same as the pen communications information signal BCS may be applied to the plurality of data lines DL disposed in the display panel DP. In addition, a signal the same as the pen communications information signal BCS may be applied to the gate lines GL.

In the touch display device 200 according to other embodiments of the present disclosure, during the blank section in which the pen communications information signal BCS is output, a signal the same as the pen communications information signal BCS may be applied to data lines DL, among the plurality of data lines DL disposed in the display panel DP, corresponding to the touch group to which the pen communications information signal BCS is output. In addition, a signal the same as the pen communications information signal BCS may be applied to gate lines GL, among the plurality of gate lines GL, corresponding to the touch group to which the pen communications information signal BCS is output.

Figure 19:
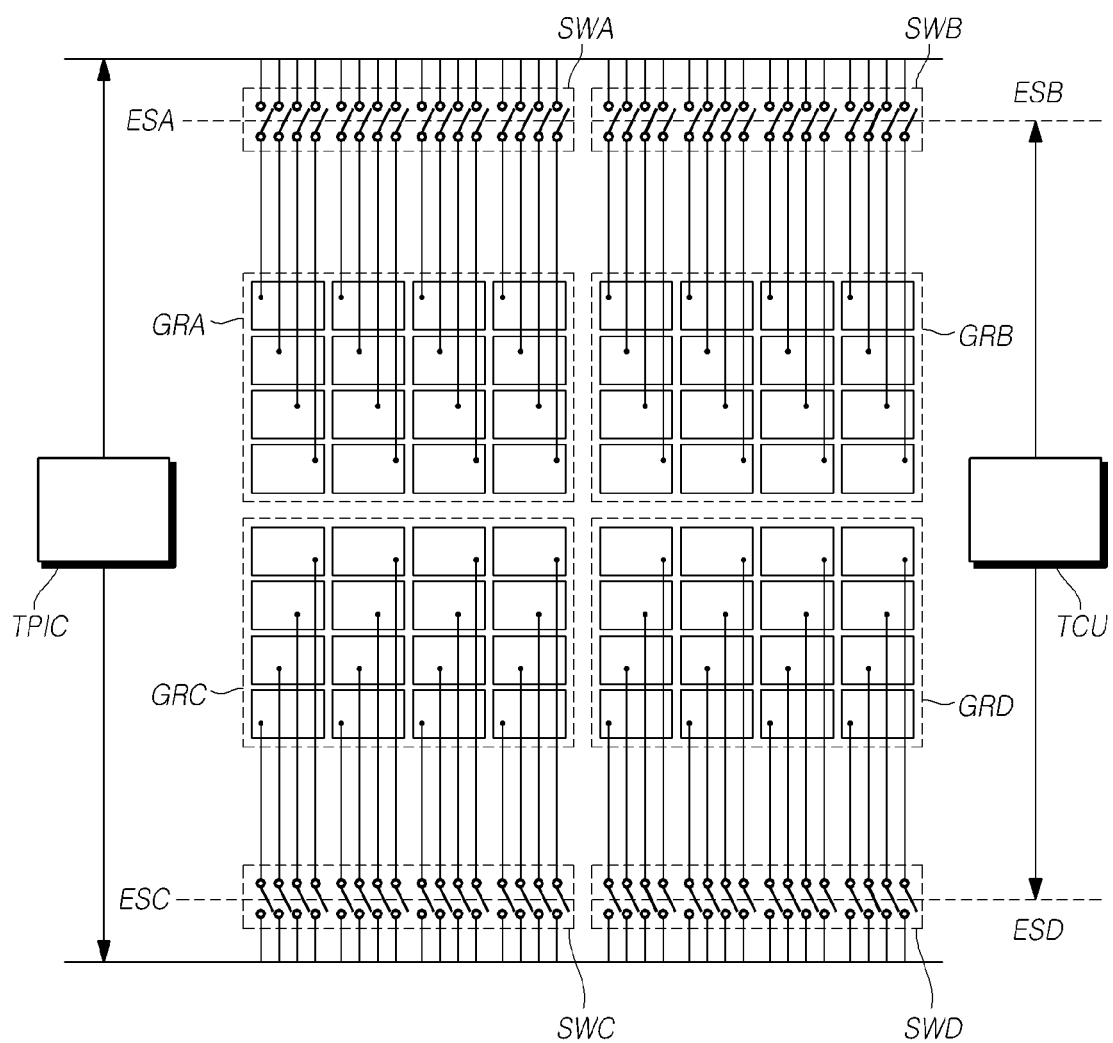
FIG. 19 schematically illustrates the touch display device according to embodiments of the present disclosure, including touch groups, respectively comprised of touch electrodes, and a plurality of connection control switches.

FIG. 19 is a schematic diagram illustrating the touch display device 200 according to embodiments of the present disclosure, including touch groups, respectively comprised of a touch electrodes, and a plurality of connection control switches.

Referring to FIG. 19, the touch display device 200 according to embodiments of the present disclosure includes a first touch group GRA, a second touch group GRB, a third touch group GRC, and a fourth touch group GRD. In addition, the touch display device 200 includes first connection control switches SWA, second connection control switches SWB, third connection control switches SWC, and fourth connection control switches SWD. Here, the first connection control switches SWA, the second connection control switches SWB, the third connection control switches SWC, and the fourth connection control switches SWD may be disposed in the display panel DP or may be disposed within the circuit of the touch driver STIC.

When it is required to output the pen communications information signal BCS to the first touch group GRA disposed in the display panel DP, the first connection control switches SWA may be controlled using a first enable signal ESA to transfer the pen communications information signal BCS, output from the touch power supply TPIC, to the first touch group GRA. Here, the touch controller TCU controls the first connection control switches SWA by controlling the output signal of the first enable signal ESA.

In the same manner, when it is required to output the pen communications information signal BCS to the second touch group GRB disposed in the display panel DP, the second connection control switches SWB may be controlled using a second enable signal ESB to transfer the pen communications information signal BCS, output from the touch power supply TPIC, to the second touch group GRB. Here, the touch controller TCU controls the second connection control switches SWB by controlling the output signal of the second enable signal ESB.

In addition, a method of controlling the output of the pen communications information signal BCS to the third touch group GRC or the fourth touch group GRD may be performed in the same manner as the above-described method of controlling the output of the pen communications information signal BCS to the first touch group GRA or the second touch group GRB.

As described above, outputs of the pen communications information signal BCS transferred to the touch groups can be controlled according to the touch groups. Accordingly, it is possible to output the pen communications information signal BCS by selecting a suitable touch group as required.

Figure 20:
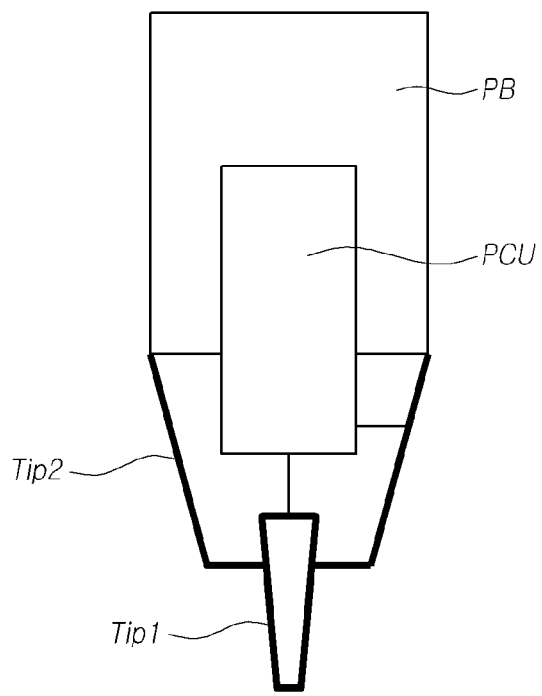
FIG. 20 schematically illustrates the pen including a first pen tip and a second pin tip, according to embodiments of the present disclosure.

FIG. 20 is a schematic view illustrating the pen including a first pen tip Tip1 and a second pin tip Tip2, according to embodiments of the present disclosure.

Referring to FIG. 20, the pen according to embodiments of the present disclosure includes the first pen tip Tip1, the second pin tip Tip2, a pen controller PCU, and a pen body PB. The pen controller PCU is embedded in the pen body PB, and the first pen tip Tip1 and the second pen tip Tip2 are exposed externally from the pen body PB.

The pen according to embodiments of the present disclosure may generate a pen output signal POS using the pen controller PCU, and output the pen output signal POS using at least one of the first pen tip Tip1 and the second pen tip Tip2. In addition, the pen may receive a pen communications information signal BCS or a pen synchronization signal PS output by the touch display device 200, using at least one of the first pen tip Tip1 and the second pen tip Tip2. The pen controller PCU generates the pen output signal POS or controls the operation of the pen, based on the received signal. For example, if the pen communications information signal BCS received from the touch display device 200 includes information regarding whether the touch display device 200 is operating in the pen search mode or the local scan mode, the pen may be set to generate the pen output signal POS or properly change the operating state thereof, in response to the received signal.

In addition, the pen controller PCU of the pen according to embodiments of the present disclosure may control the first pen tip Tip1 and the second pen tip Tip2 so that the first pen tip Tip1 and the second pen tip Tip2 are electrically connected to or insulated from each other.

Furthermore, the pen controller PCU may allow the touch display device 200 to calculate an inclination of the pen by controlling outputs of the first pen tip Tip1 and the second pen tip Tip2 to. That is, the touch display device 200 may calculate the degree of inclination of the pen, based on signals output by the first pen tip Tip1 and the second pen tip Tip2 of the pen.

The foregoing descriptions and the accompanying drawings have been presented in order to explain certain principles of the present disclosure. A person having ordinary skill in the art to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A touch display device comprising:
   a display panel including a plurality of data lines, a plurality of gate lines, a plurality of touch electrodes, and a plurality of touch lines connected to the plurality of touch electrodes, wherein the display panel alternately operates in a pen search mode during which a pen is detected or a local scan mode during which a position of the detected pen on the display panel is sensed, and wherein each of the pen search mode and the local scan mode of the display panel comprises a plurality of display sections during which an image is updated and displayed on the display panel and a plurality of blank sections during which the image is not updated on the display panel; and
   a touch driver circuit detecting a touch of the touch display device by a finger or the pen based on a change in capacitance between the plurality of touch electrodes and the finger or the pen, and
   wherein to transmit a pen communications information signal to the pen, the touch driver circuit outputs the pen communications information signal to one or more of the plurality of touch electrodes during one or more of the plurality of blank sections of the pen search mode in which at least two time slots of one or more of the plurality of display sections include at least one pen sensing section in which the touch by the pen is sensed and at least one finger sensing section in which the touch made by the finger is sensed, and as the pen is detected in the pen search mode, an operating mode of the touch display device is changed from the pen search mode to the local scan mode and the touch driver circuit senses a position of the pen during one or more of the plurality of display sections of the local scan mode based on a pen output signal output by the pen responsive the pen communications information signal, wherein the pen search mode is different from the local scan mode, and a number of finger sensing sections that is greater than a number of the pen sensing sections is included in at least one of the plurality of display sections in the pen search mode, wherein when the pen output signal is continuously detected during the local scan mode, the touch display device operates continuously in the local scan mode even when a finger touch signal is detected, and wherein while the pen output signal is not detected, when the finger touch signal is detected during the local scan mode, the operating mode of the touch display device is changed to the pen search mode.

2. The touch display device according to claim 1, wherein a voltage is applied to the plurality of data lines or the plurality of gate lines during the one or more blank sections, the voltage having a same voltage swing as the pen communications information signal.

3. The touch display device according to claim 1, wherein a number of blank sections from the plurality of blank sections of the pen search mode during which the pen communications information signal is output is less than a number of blank sections from of the plurality of blank sections during which the pen communications information signal is not output.

4. The touch display device according to claim 3, wherein blank sections of the pen search mode during which the pen communications information signal is not output are repeated aperiodically.

5. The touch display device according to claim 1, wherein the touch driver circuit does not sense the pen output signal in a display section that is directly subsequent to a blank section of the pen search mode during which the pen communications information signal is not output.

6. The touch display device according to claim 1, wherein, during a display section that is directly subsequent to a blank section of the pen search mode during which the pen communications information signal is output, the touch driver circuit outputs a pen synchronization signal to the one or more of the plurality of touch electrodes to output to the pen, the pen synchronization signal synchronizing the pen and the display panel.

7. The touch display device according to claim 1, wherein, during a display section, the touch driver circuit applies a DC voltage to the one or more of the plurality of touch electrodes to sense the pen output signal output by the pen.

8. The touch display device according to claim 1, wherein the plurality of display sections of the local scan mode each comprise at least one pen sensing section in which a touch by the pen is sensed and at least one finger sensing section in which a touch made by the finger is sensed, the at least one pen sensing section and the at least one finger sensing section non-overlapping.

9. The touch display device according to claim 1, wherein a portion of the display panel in which the pen output signal is detected is sensed in the local scan mode more than other portions of the display panel in which the pen output signal is not detected.

10. The touch display device according to claim 9, wherein the pen output signal is sensed more in the local scan mode than in the pen search mode.

11. The touch display device according to claim 1, wherein, the touch driver circuit outputs the pen communications information signal to the plurality of touch electrodes that correspond to at least one portion of an active area of the display panel during the one or more of the plurality of blank section during the pen search mode or the local scan mode.

12. The touch display device according to claim 11, wherein the at least one portion of the active area of the display panel corresponds to a touch group including a set of touch electrodes from the plurality of touch electrodes, the set of touch electrodes substantially simultaneously receiving the pen communications information signal.

13. The touch display device according to claim 11, wherein the at least one portion of the area of the display panel to which the pen communications information signal is output changes in at least two blank sections of the plurality of blank sections.

14. The touch display device according to claim 11, wherein a first portion of the area of the display panel that receives the pen communications information signal during a first blank section from the plurality of blank sections is larger than a second portion of the area of the display panel that receives the pen communications information signal during a second blank section from the plurality of blank sections.

15. The touch display device according to claim 11, wherein, during a display section the touch driver circuit applies a DC voltage to the touch electrodes corresponding to the portion of the area of the display panel, from which the pen communications information signal is output, to sense the pen output signal.

16. The touch display device according to claim 11, wherein the display panel switches from the pen search mode to the local scan mode to sense a portion of the active area of the display panel in which the pen output signal is detected more than other portions of the active area in which the pen output signal is not detected.

17. The touch display device according to claim 11, wherein, the pen communications information signal is output to all of the plurality of touch electrodes corresponding to the active area of the display panel during one or more of the plurality of blank sections in the pen search mode or the local scan mode.

18. The touch display device according to claim 11, wherein the pen communications information signal is output to a portion in which the pen output signal is detected or a portion of the active area of the display panel in which the pen output signal is predicted during one or more of the plurality of blank sections in the local scan mode.

19. The touch display device according to claim 11, wherein, the touch driver circuit outputs the pen communications information signal to a first portion of the active area of the display panel in which the pen output signal is detected and second portions of the active area surrounding the first portion or the touch driver circuit outputs the pen communications information signal to a first portion of the active area of the display panel in which the pen output signal is predicted to be output, and second portions of the active area surrounding the first portion during one or more of the plurality of blank sections in the local scan mode.

20. The touch display device according to claim 11, further comprising:
a touch power supply; and
one or more control switches electrically connecting the plurality of touch lines and the touch power supply, wherein the one or more control switches are controlled to output the pen communications information signal to the at least one portion of the active area of the display panel during the one or more of the plurality of blank section.

21. The touch display device according to claim 11, wherein the display panel remains in the local scan mode responsive to continuously detecting the pen output signal and the touch of the display panel by the finger in the local scan mode.

22. A touch display device comprising:
a display panel including a plurality of data lines, a plurality of gate lines, a plurality of touch electrodes, and a plurality of touch lines connected to the plurality of touch electrodes, wherein the display panel alternately operates in a pen search mode during which a pen is detected or a local scan mode during which a position of the detected pen on the display panel is sensed; and
a touch driver circuit detecting a touch of the touch display device by a finger or the pen based on a change in capacitance between the plurality of touch electrodes and the finger or the pen, and
wherein responsive to detecting the pen during the pen search mode in which at least two time slots of one or more of the plurality of display sections include at least one pen sensing section in which the touch by the pen is sensed and at least one finger sensing section in which the touch made by the finger is sensed, the display panel switches from the pen search mode to the local scan mode during which the touch driver circuit detects at least one of a position of the pen on the display panel during a plurality of pen sensing sections or touch of the display panel by the finger during a plurality of finger sensing sections that are non-overlapping with the plurality of pen sensing sections, the plurality of pen sensing sections and the plurality of finger sensing sections included in a display section of the display panel during which an image is updated and displayed on the display panel,
wherein the pen search mode is different from the local scan mode, and a number of finger sensing sections that is greater than a number of the pen sensing sections is included in at least one of the plurality of display sections in the pen search mode,
wherein when the pen output signal is continuously detected during the local scan mode, the touch display device operates continuously in the local scan mode even when a finger touch signal is detected, and
wherein while the pen output signal is not detected, when the finger touch signal is detected during the local scan mode, an operating mode of the touch display device is changed to the pen search mode.

23. The touch display device of claim 22, wherein the display panel switches from the local scan mode back to the pen search mode responsive to the touch driver circuit being unable to detect a position of the pen during the local scan mode.

24. The touch display device of claim 23, wherein the display panel switches from the local scan mode back to the pen search mode even though touch of the display panel by the finger is detected by the touch driver circuit during the local scan mode.

25. The touch display device of claim 22, wherein a time allocated for sensing touch of the pen during the plurality of pen sensing sections of the local scan mode is longer than a time allocated for sensing touch of the finger during the plurality of finger sensing sections of the local scan mode.

26. The touch display device of claim 22, wherein a time allocated for sensing touch of the pen during a plurality of pen sensing sections of the pen search mode is shorter than a time allocated for sensing touch of the finger during a plurality of finger sensing sections of the local scan mode.

27. The touch display device of claim 22, where a time allocated for sensing touch of the finger during the plurality of finger sensing sections of the local scan mode is less than a time allocated for sensing touch of the finger during a plurality of finger sensing sections of the pen search mode.

* * * * *